(12) United States Patent
Koseoglu et al.

(10) Patent No.: US 11,603,499 B2
(45) Date of Patent: Mar. 14, 2023

(54) HYDROPROCESS INTEGRATING OXIDIZED DISULFIDE OIL COMPOUNDS

(71) Applicant: Saudi Arabian Oil Company, Dhahran (SA)

(72) Inventors: Omer Refa Koseoglu, Dhahran (SA); Robert Peter Hodgkins, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 10 days.

(21) Appl. No.: 17/364,108

(22) Filed: Jun. 30, 2021

(65) Prior Publication Data

US 2023/0002686 A1 Jan. 5, 2023

(51) Int. Cl.

| C10G 47/00 | (2006.01) |
|---|---|
| C10G 67/02 | (2006.01) |
| B01J 19/24 | (2006.01) |
| B01D 3/14 | (2006.01) |
| B01D 3/10 | (2006.01) |
| B01D 17/02 | (2006.01) |

(52) U.S. Cl.
CPC ............... *C10G 47/00* (2013.01); *B01D 3/10* (2013.01); *B01D 3/143* (2013.01); *B01D 17/02* (2013.01); *B01J 19/245* (2013.01); *C10G 67/02* (2013.01); *B01J 2219/0004* (2013.01); *C10G 2300/107* (2013.01); *C10G 2300/1074* (2013.01); *C10G 2300/202* (2013.01); *C10G 2300/308* (2013.01); *C10G 2300/4006* (2013.01); *C10G 2300/4012* (2013.01); *C10G 2300/4018* (2013.01)

(58) Field of Classification Search
CPC .. C10G 47/00; C10G 67/02; C10G 2300/107; C10G 2300/1074; C10G 2300/202; C10G 2300/308; C10G 2300/4006; C10G 2300/4012; C10G 2300/4018; C10G 49/00; C10G 45/00; B01D 3/10; B01D 3/143; B01D 17/02; B01J 19/245; B01J 2219/0004

See application file for complete search history.

(56) References Cited

U.S. PATENT DOCUMENTS

| 4,265,735 | A | 5/1981 | Audeh et al. |
|---|---|---|---|
| 5,493,058 | A | 2/1996 | Cadot et al. |
| 7,332,145 | B2 | 2/2008 | Chretien |
| 9,580,661 | B2 | 2/2017 | Koseoglu |
| 9,777,236 | B2 | 10/2017 | Weiss et al. |
| 10,240,096 | B1* | 3/2019 | Koseoglu ............... C10G 19/02 |

(Continued)

OTHER PUBLICATIONS

Mashkina et al., "Hydrogenolysis of Dimethyl Disulfide in the Presence of Bimetallic Sulfide Catalysts," Kinetics and Catalysis, 48:1:125-131 (2007).

(Continued)

*Primary Examiner* — Randy Boyer
*Assistant Examiner* — Juan C Valencia
(74) *Attorney, Agent, or Firm* — Leason Ellis LLP

(57) ABSTRACT

Oxidized disulfide oil (ODSO) compounds or ODSO compounds and disulfide oil (DSO) compounds are reacted with a hydrogen addition feed in a hydroprocessing complex. The hydrogen addition process can include naphtha hydrotreatment, middle distillate hydrotreatment, vacuum gas oil hydrocracking, and vacuum gas oil hydrotreatment. The ODSO or ODSO and DSO components are converted to hydrogen sulfide, water and alkanes.

20 Claims, 9 Drawing Sheets

(56) References Cited

U.S. PATENT DOCUMENTS

| | | |
|---|---|---|
| 10,781,168 B2 | 9/2020 | Koseoglu et al. |
| 10,793,782 B2 | 10/2020 | Koseoglu et al. |
| 10,807,947 B2 | 10/2020 | Koseoglu et al. |
| 10,851,314 B2 | 12/2020 | Hodgkins et al. |
| 10,927,318 B2 | 2/2021 | Koseoglu et al. |
| 10,995,278 B2 | 5/2021 | Koseoglu et al. |
| 2016/0145502 A1* | 5/2016 | Koseoglu .............. C01B 17/508 423/574.1 |
| 2019/0270642 A1 | 9/2019 | Leroi et al. |
| 2020/0180953 A1 | 6/2020 | Koseoglu |
| 2020/0181073 A1* | 6/2020 | Koseoglu ............... C10G 53/12 |
| 2020/0332201 A1 | 10/2020 | Koseoglu et al. |

OTHER PUBLICATIONS

Mashkina, "Catalytic Conversions of Dialkyl Disulfides," Kinetics and Catalysis, 49:6:802-811 (2008).

Mashkina, et al., "Selective Hydrogenation of Diethyl Disulfide to Ethanethiol in the Presence of Sulfide Catalysts," Kinetics and Catalysis, 43:2:261-267 (2002).

* cited by examiner

HYDROPROCESS INTEGRATING OXIDIZED DISULFIDE OIL COMPOUNDS

BACKGROUND OF THE INVENTION

Field of the Invention

This disclosure is directed to hydroprocessing operations integrating oxidized disulfide oil (ODSO) compounds or a mixture of disulfide oil (DSO) and ODSO with a hydrogen addition or hydrogen treatment feed.

Description of Related Art

MEROX Process

The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products.

Disulfide oil (DSO) compounds are produced as a by-product of the MEROX process in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process.

As noted above, the designation "MEROX" originates from the function of the process itself, that is, the conversion of mercaptans by oxidation. The MEROX process in all of its applications is based on the ability of an organometallic catalyst in a basic environment, such as a caustic, to accelerate the oxidation of mercaptans to disulfides at near ambient temperatures and pressures. The overall reaction can be expressed as follows:

$$RSH + \tfrac{1}{4}O_2 \rightarrow \tfrac{1}{2} RSSR + \tfrac{1}{2}H_2O \qquad (1)$$

where R is a hydrocarbon chain that may be straight, branched, or cyclic, and the chains can be saturated or unsaturated. In most petroleum fractions, there will be a mixture of mercaptans so that the R can have 1, 2, 3 and up to 10 or more carbon atoms in the chain. This variable chain length is indicated by R and R' in the reaction. The reaction is then written:

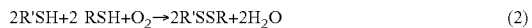

$$2R'SH + 2\ RSH + O_2 \rightarrow 2R'SSR + 2H_2O \qquad (2)$$

This reaction occurs spontaneously whenever any sour mercaptan-bearing distillate is exposed to atmospheric oxygen, but proceeds at a very slow rate. In addition, the catalyzed reaction (1) set forth above requires the presence of an alkali caustic solution, such as aqueous sodium hydroxide. The mercaptan oxidation proceeds at an economically practical rate at moderate refinery downstream temperatures.

The MEROX process can be conducted on both liquid streams and on combined gaseous and liquid streams. In the case of liquid streams, the mercaptans are converted directly to disulfides which remain in the product so that there is no reduction in total sulfur content of the effluent stream.

The MEROX process typically utilizes a fixed bed reactor system for liquid streams and is normally employed with charge stocks having end points above 135° C.-150° C. Mercaptans are converted to disulfides in the fixed bed reactor system over a catalyst, for example, an activated charcoal impregnated with the MEROX reagent, and wetted with caustic solution. Air is injected into the hydrocarbon feedstream ahead of the reactor and in passing through the catalyst-impregnated bed, the mercaptans in the feed are oxidized to disulfides. The disulfides are substantially insoluble in the caustic and remain in the hydrocarbon phase. Post treatment is required to remove undesirable by-products resulting from known side reactions such as the neutralization of $H_2S$, the oxidation of phenolic compounds, entrained caustic, and others.

The vapor pressures of disulfides are relatively low compared to those of mercaptans, so that their presence is much less objectionable from the standpoint of odor; however, they are not environmentally acceptable due to their sulfur content and their disposal can be problematical.

In the case of mixed gas and liquid streams, extraction is applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting DSO compounds are separated and the caustic solution is regenerated by oxidation with air in the presence of the catalyst and reused.

Referring to the attached drawings, FIG. 1 is a simplified schematic of a generalized version of a conventional MEROX process employing liquid-liquid extraction for removing sulfur compounds. A MEROX unit 1010, is provided for treating a mercaptan containing hydrocarbon stream 1001. In some embodiments, the mercaptan containing hydrocarbon stream is a LPG, propane stream, butane stream, a light naphtha stream, kerosene or jet fuel. The process generally includes the steps of:

introducing the hydrocarbon stream 1001 with a homogeneous catalyst into an extraction vessel 1005 containing a caustic solution 1002, in some embodiments, the catalyst is a homogeneous cobalt-based catalyst;

passing the hydrocarbon catalyst stream in counter-current flow through the extraction section of the extraction 1005 vessel in which the extraction section includes one or more liquid-liquid contacting extraction decks or trays (not shown) for the catalyzed reaction with the circulating caustic solution to convert the mercaptans to water soluble alkali metal alkane thiolate compounds;

withdrawing a hydrocarbon product stream 1003 that is free or substantially free of mercaptans from the extraction vessel 1005;

recovering a combined spent caustic and alkali metal alkane thiolate stream 1004 from the extraction vessel 1005;

subjecting the spent caustic to catalyzed wet air oxidation in a reactor 1020 into which is introduced catalyst 1005 and air 1006 to provide the regenerated spent caustic 1008 and convert the alkali metal alkane thiolate compounds to disulfide oils; and recovering a by-product stream 1007 of DSO compounds and a minor proportion of other sulfides such as monosulfides and tri-sulfides.

The effluents of the wet air oxidation step in the MEROX process preferably comprise a minor proportion of sulfides and a major proportion of disulfide oils. As is known to those skilled in the art, the composition of this effluent stream depends on the effectiveness of the MEROX process, and sulfides are assumed to be carried-over material. A variety of catalysts have been developed for the commercial practice of the process. The efficiency of the MEROX process is also a function of the amount of $H_2S$ present in the stream. It is a common refinery practice to install a prewashing step for $H_2S$ removal.

The disulfide oil compounds produced in the MEROX process can contain various disulfides. For example, a MEROX unit designed for the recovery of propane and butane yields a disulfide oil mixture with the composition set forth in Table 1:

TABLE 1

| Disulfide Oil | W % | BP, ° C. | MW, g/g-mol | Sulfur, W % |
|---|---|---|---|---|
| Dimethyldisulfide | 15.7 | 110 | 94 | 68.1 |
| Diethyldisulfide | 33.4 | 152 | 122 | 52.5 |
| Methylethyldisulfide | 49.3 | 121 | 108 | 59.3 |
| Total (Average) | 98.4 | (127) | (109) | (57.5) |

Table 1 indicates the composition of the disulfide oil that is derived from semi-quantitative GC-MS data. No standards were measured against the components; however, the data in Table 1 is accurate as representing relative quantities. Quantitative total sulfur content was determined by energy dispersive x-ray fluorescence spectroscopy which indicated 63 W % of sulfur, and this value will be used in later calculations. The GC-MS results provide evidence of trace quantities of tri-sulfide species; however, the majority of the disulfide oil stream comprises the three components identified in Table 1.

The by-product disulfide oils produced by the MEROX unit can be processed and/or disposed of in various other refinery units' operations. For example, the DSO can be added to the fuel oil pool at the expense of a resulting higher sulfur content of the pool. The DSO can be processed in a hydrotreating/hydrocracking unit at the expense of higher hydrogen consumption. The disulfide oil also has an unpleasant foul or sour smell, which is somewhat less prevalent because of its relatively lower vapor pressure at ambient temperature; however, problems exist in the handling of this oil.

An enhanced MEROX process ("E-MEROX") is a modified MEROX process where an additional step is added. In the additional step, the DSO compounds are oxidized with an oxidant in the presence of a catalyst to produce a mixture of oxidized disulfide oil (ODSO) compounds. By-product DSO compounds from the mercaptan oxidation process can be oxidized, preferably in the presence of a catalyst, and constitute an abundant source of ODSO compounds that are sulfoxides, sulfonates, sulfinates, sulfones and their corresponding di-sulfur mixtures.

The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. The catalyst is preferably a homogeneous water-soluble compound that is a transition metal containing an active species selected from the group consisting of Mo (VI), W (VI), V (V), Ti (IV), and their combination.

The ODSO compounds produced in the E-MEROX process generally comprise two phases: a water-soluble phase and water-insoluble phase. The E-MEROX process can be tuned depending on the desired ratio of water-soluble to water-insoluble compounds presented in the product ODSO mixture. Partial oxidation of DSO compounds results in a higher relative amount of water-insoluble ODSO compounds present in the ODSO product and a near or almost complete oxidation of DSO compounds results in a higher relative amount of water-soluble ODSO present in the ODSO product. Details of the ODSO compositions is discussed in the U.S. Pat. No. 10,781,168, which is incorporated herein by reference.

FIG. 2 is a simplified schematic of a generalized conventional version of an E-MEROX process that includes E-MEROX unit 1030. The MEROX unit 1010 unit operates similarly as in FIG. 1, with similar references numbers representing similar units/feeds.

In FIG. 2, the effluent stream 1007 from the generalized MEROX unit of FIG. 1 is treated. It will be understood that the processing of the mercaptan containing hydrocarbon stream of FIG. 1 is illustrative only and that separate streams of the products, and combined or separate streams of other mixed and longer chain products can be the subject of the process for the recovery and oxidation of DSO to produce ODSO compounds, that is the E-MEROX process.

In order to practice the E-MEROX process, it is necessary to add apparatus to recover the by-product DSO compounds from the MEROX process and provide (a) a suitable reactor 1035 into which the DSO compounds are introduced in the presence of a catalyst 1032 and an oxidant 1034 and subjecting the DSO compounds to a catalytic oxidation step to produce the mixed stream 1036 of water and ODSO compounds, and (b) a separation vessel 1040 to separate the by-product 1044 from the ODSO compounds 1042. By-product 1044 generally comprises wastewater when hydrogen peroxide is used as the oxidant. Alternatively, when other organic peroxides are used as the oxidant, the by-product 1044 generally comprises the alcohol of the peroxide used. For example, if butyl peroxide is used as the oxidant, the by-product alcohol 1044 would be butanol.

Water soluble ODSO compounds are passed to a fractionation zone (not shown) for recovery following their separation from the wastewater fraction. The fractionation zone can include a distillation unit. In certain embodiments, the distillation unit can be a flash distillation unit with no theoretical plates in order to obtain distillation cuts with larger overlaps with each other or, alternatively, on other embodiments, the distillation unit can be a flash distillation unit with at least 15 theoretical plate in order to have effective separation between cuts. In certain embodiments, the distillation unit can operate at atmospheric pressure and at a temperature in the range of from 100° C. to 225° C. In other embodiments, the fractionation can be carried out continuously under vacuum conditions. In those embodiments, fractionation occurs at reduced pressures and at their respective boiling temperatures. For example, at 350 mbar and 10 mbar, the temperature ranges are from 80° C. to 194° C. and 11° C. to 98° C., respectively. Following fractionation, the wastewater is sent to the wastewater pool (not shown) for conventional treatment prior to its disposal. The wastewater by-product fraction can contain a small amount of water insoluble ODSO compounds, for example, in the range of from 1 ppmw to 10,000 ppmw. The wastewater by-product fraction can contain a small amount of water soluble ODSO compounds, for example, in the range of from 1 ppmw to 50,000 ppmw, or 100 ppmw to 50,000 ppmw. In embodiments where alcohol is the by-product alcohol, the alcohol can be recovered and sold as a commodity product or added to fuels like gasoline. The alcohol by-product fraction can contain a small amount of water insoluble ODSO compounds, for example, in the range of from 1 ppmw to 10,000 ppmw. The alcohol by-product fraction can contain a small amount of water soluble ODSO compounds, for example, in the range of from 100 ppmw to 50,000 ppmw As described in U.S. Pat. No. 10,927,318, the ODSO compounds have been found to have utility as lubricity additives for diesel fuels that are more economical than currently available additives for that purpose, and as described in U.S. Pat. No. 10,793,782, the ODSO compounds have also been found to have utility as solvents for aromatic solvent extraction processes, both of which are incorporated herein by reference. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory to reduce refinery waste.

In a conventional refinery arrangement, it is known to use several hydroprocessing zones in order to treat specific fractions of hydrocarbon feeds, such as crude oil. Hydroprocessing is useful for the purpose of improving the hydrocarbon feed for example, by reduction of sulfur content of the hydrocarbon feeds, an increase in the API gravity of the hydrocarbon feeds, a reduction in the metal content of the hydrocarbon feeds, or a combination thereof. Conventional hydroprocessing technologies such as hydrocracking and two-stage hydrotreating offer solutions to refiners for the production of clean transportation fuels. These technologies are available and can be applied as new grassroots production facilities are constructed. Examples of conventional hydroprocessing technologies include naphtha hydrotreating units, diesel hydrotreating units, vacuum gas oil hydrotreating units and vacuum gas oil hydrocracking units.

Thus, there is a clear and long-standing need to provide an efficient and economical process for the treatment of the large volumes of DSO by-products and their derivatives to effect and modify their properties in order to facilitate and simplify their environmentally acceptable disposal, and/or to permit the utilization of the modified products within the refinery, and thereby enhance the value of this class of by-products to the refiner.

SUMMARY OF THE INVENTION

The above needs are realized and other advantages are provided by the process of the present invention that economically uses oxidized disulfide oils or a blend of oxidized disulfide oils and disulfide oils, which are of relatively low value, as a reactant in a hydroprocessing zone. The hydroprocessing zone reacts a hydroprocessing feed in the presence of hydrogen and an ODSO stream and converts the oxidized disulfide oils or a blend of oxidized disulfide oils and disulfide oils into hydrogen sulfide, water and alkanes. In certain embodiments an integrated MEROX, E-MEROX and the hydroprocessing zone is provided that also improves refinery dynamics and efficiencies by adding an outlet for ODSO compounds and OSDO/DSO mixtures.

In an embodiment, the present disclosure is directed to a hydroprocessing reaction process comprising reacting a hydroprocessing feed in the presence of hydrogen and an oxidized disulfide oil (ODSO) stream containing ODSO compounds and recovering hydrocracked or hydrotreated effluents and light gases. The ODSO compounds are converted into hydrogen sulfide, water and alkanes under hydroprocessing reaction conditions. The hydrogen sulfide and C1-C4 alkanes produced by the reaction of ODSO or ODSO/DSO with hydrogen pass with the light gases and C5-C10 alkanes produced by the reaction of ODSO or ODSO/DSO with hydrogen and pass with the hydrocracked or hydrotreated effluent.

In some embodiments, the hydroprocessing feed is mixed with the ODSO (or ODSO/DSO) stream to produce an enhanced hydroprocessing feed that contains ODSO components. In other embodiments, hydroprocessing feed and ODSO (or ODSO/DSO) stream are sent via separate inlets to hydroprocessing zone. In some embodiments, the mixing is in a mixing zone.

In some embodiments, a DSO stream is combined with the ODSO stream prior to its reaction with the hydroprocessing feed stream to produce a combined ODSO/DSO stream that is reacted with the hydroprocessing feed to produce an enhanced hydroprocessing feed contains ODSO and DSO components.

In some embodiments, the DSO stream is derived from an effluent refinery hydrocarbon stream recovered downstream of an MEROX unit. In some embodiments, the ODSO stream is derived from an effluent refinery hydrocarbon stream recovered downstream of an E-MEROX unit.

In some embodiments, a feed to the MEROX unit is from a source that is the same as a source for the hydroprocessing feed stream.

In some embodiments, the hydroprocessing reaction takes place in a hydroprocessing complex. In some embodiments, the ODSO source is in direct or indirect fluid communication with a hydroprocessing reaction in the hydroprocessing complex. For example, in some embodiments, one or more outlets of the E-MEROX unit can be in fluid communication with the hydroprocessing reactor.

In some embodiments, an atmospheric distillation unit treats a crude oil or condensates stream upstream of the hydroprocessing complex to produce an atmospheric distillation product stream. The atmospheric distillation product stream can be the hydroprocessing feed stream. In some embodiments, the atmospheric distillation product stream is a naphtha stream and the hydroprocessing complex comprises a naphtha hydrotreatment zone. In some embodiments, the atmospheric distillation product stream is a middle distillate stream and the hydroprocessing complex comprises a middle distillates hydrotreatment zone.

In some embodiments, the atmospheric distillation product is an atmospheric residue stream, and the atmospheric residue stream is treated in a vacuum distillation unit to produce a vacuum gas oil stream that is the hydroprocessing feed stream. In this embodiment, the hydroprocessing complex comprises a vacuum gas oil hydroprocessing zone. In some embodiments, the vacuum gas oil hydroprocessing zone comprises a vacuum gas oil hydrotreater. In other embodiments, the vacuum gas oil hydroprocessing zone comprises a vacuum gas oil hydrocracker.

In some embodiments, the DSO stream comprises one or more disulfide compounds. In some embodiments, the ODSO stream comprises one or more oxidized disulfide compounds.

In an embodiment, the present disclosure is directed to an integrated hydroprocessing system comprising an E-MEROX unit operable to receive and convert a DSO stream feed into an ODSO stream and a hydroprocessing complex operable to receive and convert a hydroprocessing feed and an ODSO stream and produce a hydrotreated or hydrocracked effluent from the hydroprocessing feed and hydrogen sulfide, water and alkanes from the ODSO stream. In some embodiments, the E-MEROX unit comprises one or more inlets in fluid communication with a source of DSO stream and one or more outlets. In some embodiments, the hydroprocessing complex comprises one or more inlets in fluid communication with a source of hydroprocessing feed and the one or more E-MEROX outlets.

In some embodiments, the system comprises a mixing zone operable to receive and mix the ODSO stream and the hydroprocessing feed. In some embodiments, the mixing zone comprises one or more inlets in fluid communication with a source of ODSO stream, one or more inlets in fluid communication with a source of hydroprocessing feed, and one or more outlets in fluid communication with the one or more inlets of the hydroprocessing complex.

In some embodiments, the system comprises a MEROX unit operable to receive and convert a mercaptan containing stream feed into a DSO stream. The MEROX unit can comprise one or more inlets in fluid communication with a source of the mercaptan containing stream and one or more outlets.

In some embodiments, the system comprises an atmospheric distillation unit (ADU) operable to receive and separate a feed. The ADU can discharge a first ADU fraction comprising naphtha, a second ADU fraction comprising middle distillates, and a third ADU fraction comprising atmospheric residue. The ADU can comprise one or more inlets in fluid communication with a source of crude oil or condensates, one or more first outlets for discharging a naphtha fraction, one or more second outlets for discharging a middle distillates fraction, and one or more third outlets for discharging an atmospheric residue fraction.

In some embodiments, the system comprises a vacuum distillation unit (VDU) operable to receive and separate the third ADU fraction. The VDU can discharge a first VDU fraction comprising vacuum gas oil. The VDU can comprise one or more inlets in fluid communication with the one or more third ADU outlets and one or more outlets.

In some embodiments, the hydroprocessing complex comprises a naphtha hydrotreatment zone and the one or more first ADU outlets is in fluid communication with the one or more hydroprocessing complex inlets.

In some embodiments, the hydroprocessing complex comprises a middle distillates hydrotreatment zone and the one or more second ADU outlets is in fluid communication with the one or more hydroprocessing complex inlet.

In some embodiments, the hydroprocessing complex comprises a vacuum gas oil hydroprocessing zone and the one or more VDU outlets is in fluid communication with the one or more hydroprocessing complex inlet.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The process of the disclosure will be described in more detail below and with reference to the attached drawings in which the same number is used for the same or similar elements, and where.

DETAILED DESCRIPTION OF PREFERRED EMBODIMENTS

Figures 1, 2:
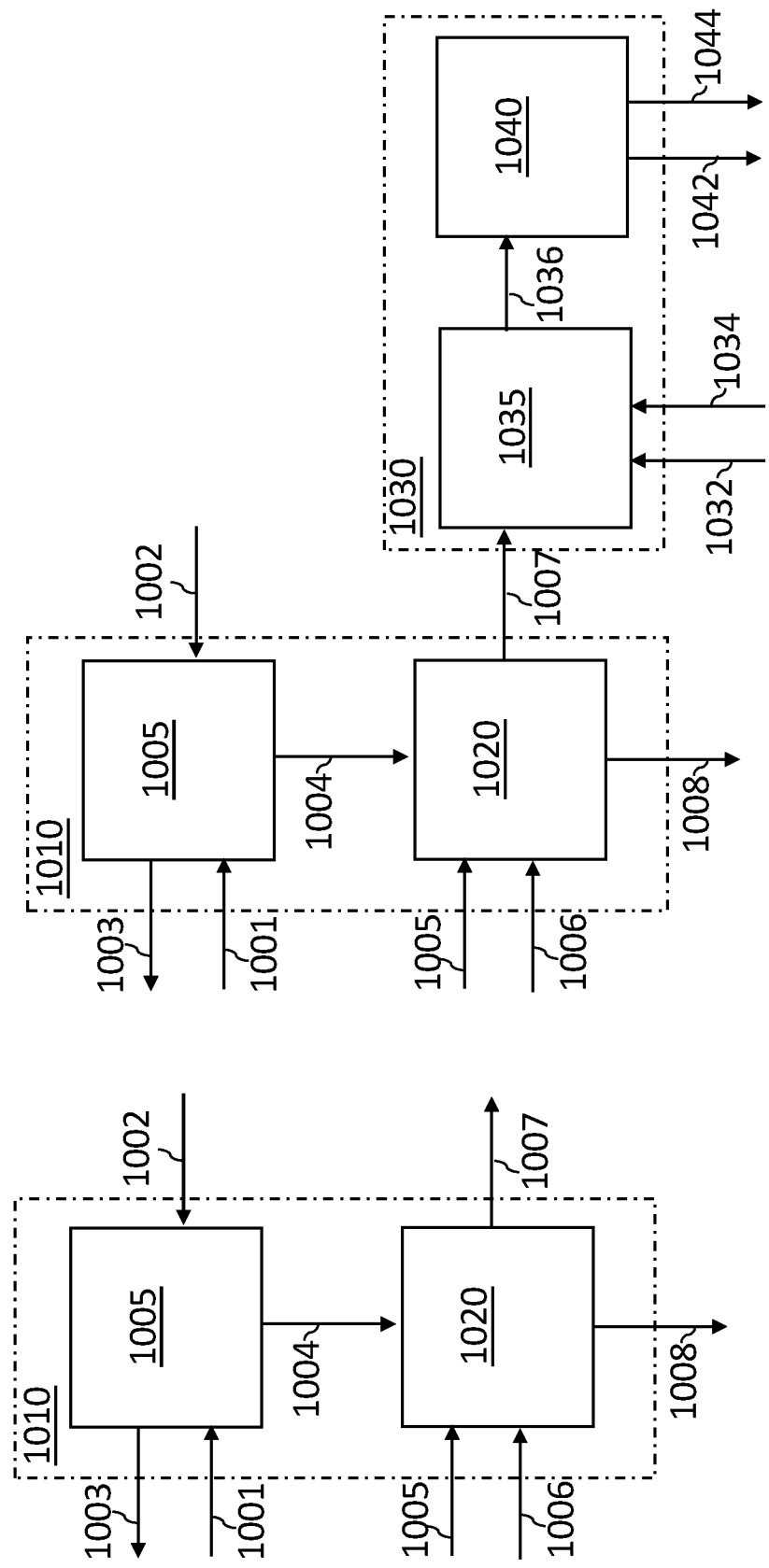
FIG. 1 is a simplified schematic diagram of a generalized version of a conventional mercaptan oxidation or MEROX process for the liquid-liquid extraction of a mercaptan containing hydrocarbon stream.
FIG. 2 is a simplified schematic diagram of a generalized version of an enhanced mercaptan oxidation or E-MEROX process.

Disclosed herein are processes and systems that economically use oxidized disulfide oils or a blend of oxidized disulfide oils and disulfide oils, which are of relatively low value, as a co-feed in a hydroprocessing zone.

In the description that follows, the terms "disulfide oil", "DSO", "DSO mixture" and "DSO compounds" may be used interchangeably for convenience.

In the description that follows, the terms "oxidized disulfide oil", "derivative of disulfide oil", "ODSO", "ODSO mixture" and "ODSO compound(s)" may be used interchangeably for convenience.

In the description that follows, the terms "DSO/ODSO", "DSO/ODSO mixture" and "DSO/ODSO compound(s)" may be used interchangeably for convenience.

The phrase "a major portion" with respect to a particular stream or plural streams means at least about 50 wt % and up to 100 wt %, or the same values of another specified unit.

The phrase "a significant portion" with respect to a particular stream or plural streams means at least about 75 wt % and up to 100 wt %, or the same values of another specified unit.

The phrase "a substantial portion" means at least about 90, 95, 98 or 99 wt % and up to 100 wt %, or the same values of another specified unit.

The phrase "a minor portion" with respect to a particular stream or plural streams means from about 1, 2, 4 or 10 wt %, up to about 20, 30, 40 or 50 wt %, or the same values of another specified unit.

The term "crude oil" as used herein refers to petroleum extracted from geologic formations in its unrefined form. Crude oil suitable as the source material for the processes herein include Arabian Heavy, Arabian Light, Arabian Extra Light, other Gulf crudes, Brent, North Sea crudes, North and West African crudes, Indonesian, Chinese crudes, or mixtures thereof. The crude petroleum mixtures can be whole range crude oil or topped crude oil. As used herein, "crude oil" also refers to such mixtures that have undergone some pre-treatment such as water-oil separation; and/or gas-oil separation; and/or desalting; and/or stabilization. In certain embodiments, crude oil refers to any of such mixtures having an API gravity (ASTM D287 standard), of greater than or equal to about 20°, 30°, 32°, 34°, 36°, 38°, 40°, 42° or 44°.

The acronym "LPG" as used herein refers to the well-known acronym for the term "liquefied petroleum gas," and generally is a mixture of C3-C4 hydrocarbons. In certain embodiments, these are also referred to as "light ends."

As used herein, all boiling point ranges relative to hydrocarbon fractions derived from crude oil via atmospheric and/or shall refer to True Boiling Point values obtained from a crude oil assay, or a commercially acceptable equivalent.

The term "naphtha" as used herein refers to hydrocarbons boiling in the range of about 20-205, 20-193, 20-190, 20-180, 20-170, 32-205, 32-193, 32-190, 32-180, 32-170, 36-205, 36-193, 36-190, 36-180 or 36-170° C.

In certain embodiments naphtha, light naphtha and/or heavy naphtha refer to such petroleum fractions obtained by crude oil distillation, or distillation of intermediate refinery processes as described herein.

The modifying term "straight run" is used herein having its well-known meaning, that is, describing fractions derived directly from the atmospheric distillation unit, optionally subjected to steam stripping, without other refinery treatment such as hydroprocessing, fluid catalytic cracking or steam cracking. An example of this is "straight run naphtha" and its acronym "SRN" which accordingly refers to "naphtha" defined above that is derived directly from the atmospheric distillation unit, optionally subjected to steam stripping, as is well known.

In certain embodiments, the term "middle distillate" is used with reference to one or more straight run fractions from the atmospheric distillation unit, for instance containing hydrocarbons having a nominal boiling range of about 160-400, 160-380, 160-370, 160-360, 160-340, 170-400, 170-380, 170-370, 170-360, 170-340, 180-400, 180-380, 180-370, 180-360, 180-340, 190-400, 190-380, 190-370, 190-360, 190-340, 193-400, 193-380, 193-370, 193-360, or 193-340° C. In embodiments in which other terminology is used herein, the middle distillate fraction can also include all or a portion of AGO range hydrocarbons, all or a portion of kerosene, all or a portion of medium AGO range hydrocarbons, and/or all or a portion of heavy kerosene range hydrocarbons. In additional embodiments, term "middle distillate" is used to refer to fractions from one or more integrated operations boiling in this range.

The term "kerosene" as used herein refers to hydrocarbons boiling in the range of about 160-280, 160-270, 160-260, 170-280, 170-270, 170-260, 180-280, 180-270, 180-260, 190-280, 190-270, 190-260, 193-280, 193-270 or 193-260° C.

The term "light kerosene" as used herein refers to hydrocarbons boiling in the range of about 160-250, 160-235, 160-230, 160-225, 170-250, 170-235, 170-230, 170-225, 180-250, 180-235, 180-230, 180-225, 190-250, 190-235, 190-230 or 190-225° C.

The term "heavy kerosene" as used herein refers to hydrocarbons boiling in the range of about 225-280, 225-270, 225-260, 230-280, 230-270, 230-260, 235-280, 235-270, 235-260 or 250-280° C.

The term "atmospheric gas oil" and its acronym "AGO" as used herein refer to hydrocarbons boiling in the range of about 205-400, 205-380, 205-370, 205-360, 205-340, 205-320, 240-400, 240-380, 240-370, 240-360, 240-340, 240-320, 270-400, 270-380, 270-370, 270-360, 270-340 or 270-320° C.

The term "heavy atmospheric gas oil" and its acronym "H-AGO" as used herein in certain embodiments refer to the heaviest cut of hydrocarbons in the AGO boiling range including the upper 3-30° C. range (for example, for AGO having a range of about 250-360° C., the range of H-AGO includes an initial boiling point from about 330-357° C. and an end boiling point of about 360° C.). For example, H-AGO can include hydrocarbons boiling in the range of about 290-400, 290-380, 290-370, 310-400, 310-380, 310-370, 330-400, 330-380, 330-370, 340-400, 340-380, 340-370, 350-400, 350-380, 350-370, 360-370, 365-370, 290-360, 310-360, 330-360, 340-360, 350-360, 355-360, 290-340, 310-340, 330-340, 335-340, 290-320, 310-320 or 315-320° C.

In certain embodiments, the term "diesel" is used with reference to a straight run fraction from the atmospheric distillation unit, for instance containing hydrocarbons boiling in the nominal range of about 180-370° C. In embodiments in which this terminology is used herein, the diesel fraction also refers to medium AGO range hydrocarbons and in certain embodiments also in combination with heavy kerosene range hydrocarbons.

The term "atmospheric residue" and its acronym "AR" as used herein refer to the bottom hydrocarbons having an initial boiling point corresponding to the end point of the AGO range hydrocarbons, and having an end point based on the characteristics of the crude oil feed.

The term "vacuum gas oil" and its acronym "VGO" as used herein refer to hydrocarbons boiling in the range of about 370-550, 370-540, 370-530, 370-510, 400-550, 400-540, 400-530, 400-510, 420-550, 420-540, 420-530 or 420-510° C.

The term "light vacuum gas oil" and its acronym "LVGO" as used herein refer to hydrocarbons boiling in the range of about 370-425, 370-415, 370-405, 370-395, 380-425, 390-425 or 400-425° C.

The term "heavy vacuum gas oil" and its acronym "HVGO" as used herein refer to hydrocarbons boiling in the range of about 425-550, 425-540, 425-530, 425-510, 450-550, 450-540, 450-530 or 450-510° C. The term "vacuum residue" and its acronym "VR" as used herein refer to the bottom hydrocarbons having an initial boiling point corresponding to the end point of the VGO range hydrocarbons, and having an end point based on the characteristics of the crude oil feed.

The term "fuels" refers to crude oil-derived products used as energy carriers. Fuels commonly produced by oil refineries include, but are not limited to, gasoline, jet fuel, diesel fuel, fuel oil and petroleum coke. Unlike petrochemicals, which are a collection of well-defined compounds, fuels typically are complex mixtures of different hydrocarbon compounds.

The terms "diesel fuel" and "diesel fuel products" refer to fuel products used as energy carriers suitable for compression-ignition engines (and precursors for producing such fuel products). Diesel fuel includes but is not limited to ultra-low sulfur diesel compliant with Euro V diesel standards.

The term "unconverted oil" and its acronym "UCO," is used herein having its known meaning, and refers to a highly paraffinic fraction from a hydrocracker with a low nitrogen, sulfur and Ni content and including hydrocarbons having an initial boiling point corresponding to the end point of the AGO range hydrocarbons, in certain embodiments the initial boiling point in the range of about 340-370° C., for instance about 340, 360 or 370° C., and an end point in the range of about 510-560° C., for instance about 540, 550 or 560° C. UCO is also known in the industry by other synonyms including "hydrowax."

The term "C# hydrocarbons" or "C#", is used herein having its well-known meaning, that is, wherein "#" is an integer value, and means hydrocarbons having that value of carbon atoms. The term "C#+ hydrocarbons" or "C#+" refers to hydrocarbons having that value or more carbon atoms. The term "C#− hydrocarbons" or "C#-" refers to hydrocarbons having that value or less carbon atoms. Similarly, ranges are also set forth, for instance, C1-C3 means a mixture comprising C1, C2 and C3.

Figure 3:
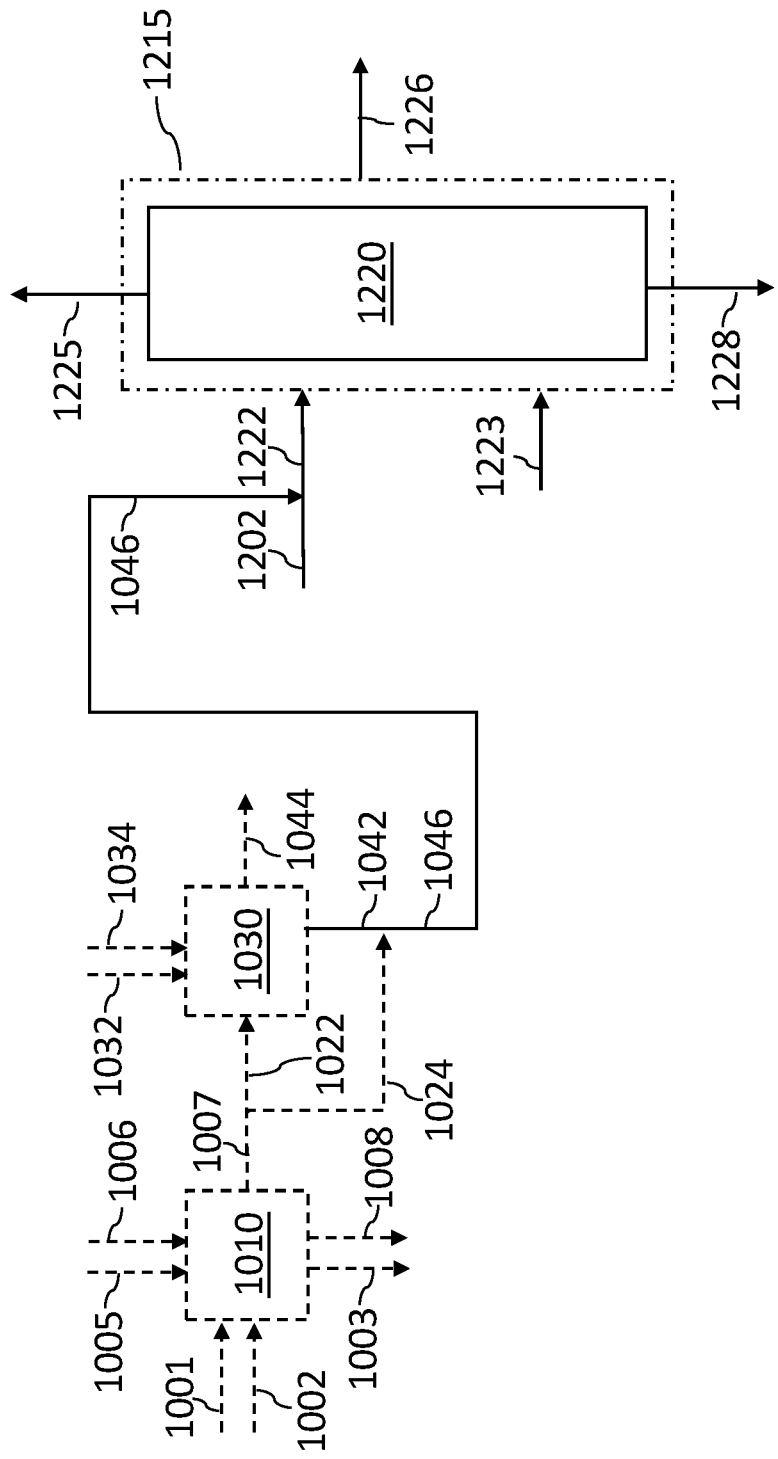
FIG. 3 is a simplified schematic diagram of an embodiment of a hydroprocessing zone present disclosure.

With reference to FIG. 3, in an embodiment of the process and system an ODSO stream 1046 and a hydroprocessing feed 1202 are mixed and sent along with a source of hydrogen 1223 to a hydroprocessing zone 1220 within a hydroprocessing complex 1215.

In certain embodiments, a DSO stream can be mixed with ODSO stream 1046 to produce combined DSO/ODSO stream that is then mixed with hydroprocessing feed 1202. In certain embodiments, the mixing can be carried out in a mixing zone by mixing techniques known in the art such as with a separate mixing vessel equipment with a stirrer, an injector and/or an in-line mixer (not shown).

Optionally, the ODSO stream or both the ODSO and DSO stream can be derived from an effluent refinery hydrocarbon stream recovered from a MEROX 1010 and E-MEROX 1030 unit, that operate similarly to the MEROX and E-MEROX units in FIGS. 1 and 2, with similar references numbers representing similar units/feeds A hydroprocessing feed 1202 is mixed, optionally in a mixing zone (not shown), with ODSO (or ODSO/DSO) stream 1046 to form an enhanced hydroprocessing feed 1222 which is sent to one or more inlets of a hydroprocessing zone 1220 along with a source of hydrogen 1223. In certain embodiments, ODSO (or ODSO/DSO) stream 1046 is injected into the hydroprocessing feed pipe that contains hydroprocessing feed 1202. In certain embodiments, the turbulent flow in the pipe ensures that the streams are well mixed prior to entering the reaction vessel(s). In other embodiments (not shown), hydroprocessing feed 1202 and ODSO (or ODSO/DSO) stream 1046 are sent via separate inlets to hydroprocessing zone 1220 along with a source of hydrogen 1223. In this embodiment, the hydroprocessing feed 1202 and ODSO (or ODSO/DSO) stream 1046 are internally mixed within hydroprocessing zone 1220 prior to conversion. In each embodiment, the reactants in the reactor in the hydroprocessing zone 1220 include the hydroprocessing feed 1202 and the ODSO (or ODSO/DSO) compounds from stream 1046.

In each embodiment, the hydroprocessing zone 1220 within the hydroprocessing complex 1215, generally converts a hydroprocessing feed 1222 into hydroprocessing products obtained from the hydroprocessing complex 1215, which generally comprise light gases 1225, a hydroprocessing liquid products stream 1226 and unconverted oil 1228. Unconverted oil 1228 can include heavy oil.

The ODSO components or the combination of the DSO/ODSO components in the enhanced hydroprocessing feed 1222 are converted to hydrogen sulfide, water and alkanes. The light gases 1225 generally includes the hydrogen sulfide and C1-C4 alkanes, including those produced by the reaction of ODSO or ODSO/DSO with hydrogen. The hydroprocessing liquid products stream 1226 generally include hydroprocessed products derived from the initial feed and C5-C10 alkanes produced by the reaction of ODSO or ODSO/DSO with hydrogen.

In some embodiments, after the conversion step, water is injected into the effluents from the hydroprocessing reactor to dissolve ammonia sulfide formed. Water produced by the reaction of ODSO or ODSO/DSO with hydrogen is in the aqueous phase along with excess injected water. The effluents from the hydroprocessing reactor are sent to an oil/water separation unit (not shown) before distillation within the hydroprocessing reactor to remove water. The alkanes produced are derived from the alkyl groups (R-groups) attached to the ODSO or the ODSO/DSO compounds in the ODSO (or ODSO/DSO) stream 1046.

Figure 4:
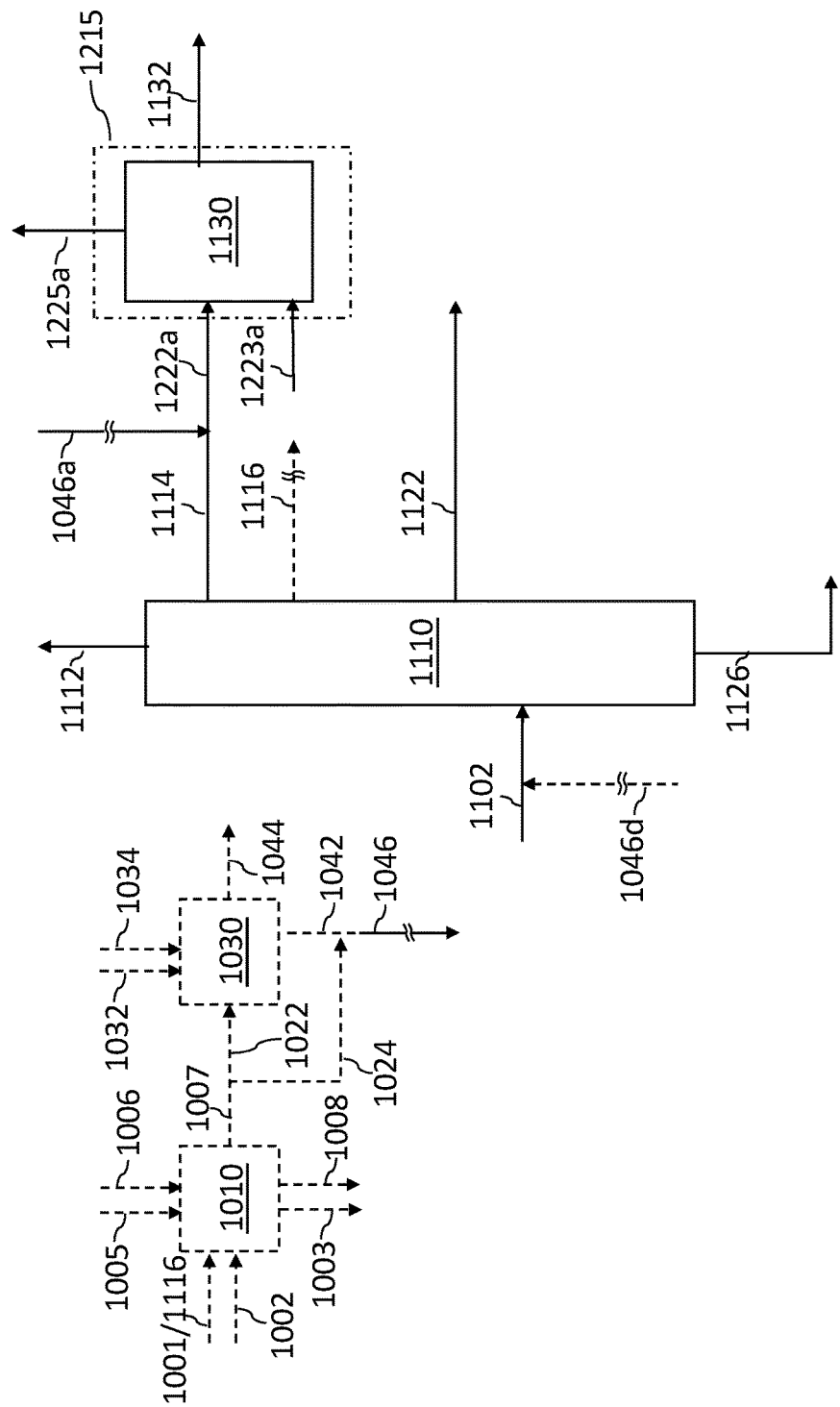
FIG. 4 is a simplified schematic diagram of a naphtha hydrotreating embodiment of the integrated process of the present disclosure.

With reference to FIG. 4, an embodiment of the process and system is schematically depicted within a refinery generally including a separation zone 1110 that includes an atmospheric distillation unit (ADU) and a hydroprocessing complex 1215 that includes a naphtha hydrotreater 1130. A feed 1102 is separated into fractions in a separation zone 1110. The feed 1102 can be crude oil or condensates, bitumens, biofuels or coal liquefaction products. In certain embodiments, the feed can be crude oil that has been subjected to hydrotreating (hydrotreated crude oil), solvent deasphalting (deasphalted oil) or coking, such as delayed coking liquid products, or fluid catalytic cracking unit. The separation zone that includes an ADU is used in well-known arrangements. The feed 1102, is separated into fractions in the separation zone 1110. Light products, for instance, light hydrocarbons with fewer than six carbons, such as, C2-C4 hydrocarbons including ethane, propane and butanes, light ends and LPG 1112 are discharged from separation zone 1110 for optional downstream processing.

Straight run naphtha 1114 from the separation zone 1110 is passed to the naphtha hydrotreater 1130. Naphtha 1114 is mixed, optionally in a mixing zone (not shown), with ODSO (or ODSO/DSO) stream 1046a to form an enhanced naphtha feed 1222a which is sent to one or more inlets of a naphtha hydrotreater 1130 along with a source of hydrogen 1223a. In certain embodiments, ODSO (or ODSO/DSO) stream 1046a is injected into the naphtha hydrotreater feed pipe that contains naphtha 1114. In certain embodiments, the mixing can be carried out in a mixing zone by mixing techniques known in the art such as with a separate mixing vessel equipment with a stirrer, an injector and/or an in-line mixer. In certain embodiments, the turbulent flow in the pipe ensures that the streams are well mixed prior to entering the reaction vessel(s). In other embodiments (not shown), naphtha 1114 and ODSO (or ODSO/DSO) stream 1046a are sent via separate inlets to naphtha hydrotreater 1130 along with a source of hydrogen 1223a. In this embodiment, the naphtha 1114 and ODSO (or ODSO/DSO) stream 1046a are internally mixed within naphtha hydrotreater 1130 prior to conversion. In each embodiment, the reactants in the reactor in the naphtha hydrotreater 1130 include the naphtha 1114 and the ODSO (or ODSO/DSO) compounds from stream 1046a.

The naphtha hydrotreater 1130 within the hydroprocessing complex 1215, generally converts an enhanced naphtha feed 1222a into hydroprocessing products which generally comprise light gases 1225a and hydrotreated naphtha products 1132.

The ODSO components or the combination of the DSO/ODSO components in the enhanced hydroprocessing feed 1222a are converted to hydrogen sulfide, water and alkanes. The light gases 1225a generally includes the hydrogen sulfide and C1-C4 alkanes, including those produced by the reaction of ODSO or ODSO/DSO with hydrogen. The hydrotreated naphtha products 1132 generally include the naphtha range products derived from the initial feed and C5-C10 alkanes produced by the reaction of ODSO or ODSO/DSO with hydrogen.

In some embodiments, after the conversion step, water is injected into the effluents from the hydroprocessing reactor to dissolve ammonia sulfide formed. Water produced by the reaction of ODSO or ODSO/DSO with hydrogen is in the aqueous phase along with excess injected water. The effluents from the hydroprocessing reactor are sent to an oil/water separation unit (not shown) before distillation within the hydroprocessing reactor to remove water. The alkanes produced are derived from the alkyl groups (R-groups) attached to the ODSO or the ODSO/DSO compounds in ODSO (or ODSO/DSO) stream 1046.

In certain embodiments a middle distillate fraction 1122 and an atmospheric residue fraction 1126 from the separation zone 1110 are separated and discharged from separation zone 1110.

In certain embodiments, at least two different middle distillate cuts are separated and discharged from separation zone 1110. A second atmospheric distillation zone middle distillate fraction 1122, in certain embodiments referred to as a diesel fraction, contains heavy kerosene range hydrocarbons and medium AGO range hydrocarbons. An optional first atmospheric distillation zone middle distillate fraction 1116, in certain embodiments referred to as a kerosene fraction, contains light kerosene range hydrocarbons. In another example, an optional first middle distillate fraction 1116 contains kerosene range hydrocarbons and a second middle distillate fraction 1122 contains medium AGO range hydrocarbons. In another example, an optional first middle distillate fraction 1116 contains light kerosene range hydrocarbons and a portion of heavy kerosene range hydrocarbons and a second middle distillate fraction 1122 contains a portion of heavy kerosene range hydrocarbons and a portion of medium AGO range hydrocarbons. The second middle distillate fraction 1122 is separated and discharged from separation zone 1110 using the arrangement shown in FIG. 4. The optional first middle distillate fraction 1116 can be separated and discharged from separation zone 1110 using the arrangement shown in FIG. 4. In certain embodiments the first middle distillate fraction 1116 can be used as a feed to MEROX unit.

In certain optional embodiments, the source of ODSO (or ODSO/DSO) stream 1046a is an integrated MEROX unit 1010 and enhanced MEROX (E-MEROX) unit 1030 (shown in dashed lines) that operate similarly to the those in FIGS. 1-2, with similar references numbers representing similar units/feeds. All or a portion of by-product stream of DSO compounds 1007 from MEROX unit 1010 is sent to E-MEROX unit 1030 via stream 1022 for conversion into an ODSO stream 1042.

In certain embodiments, a portion of the DSO stream 1007, stream 1024, is mixed with ODSO stream 1042 to produce combined DSO/ODSO stream 1046 that is then mixed with naphtha stream 1114.

In certain embodiments, an ODSO (or ODSO/DSO) stream 1046d can be mixed with crude feed 1102. In certain embodiments, a portion of ODSO (or ODSO/DSO) stream 1046 from E-MEROX unit 1030 can be the source of stream 1046d.

Figure 5:
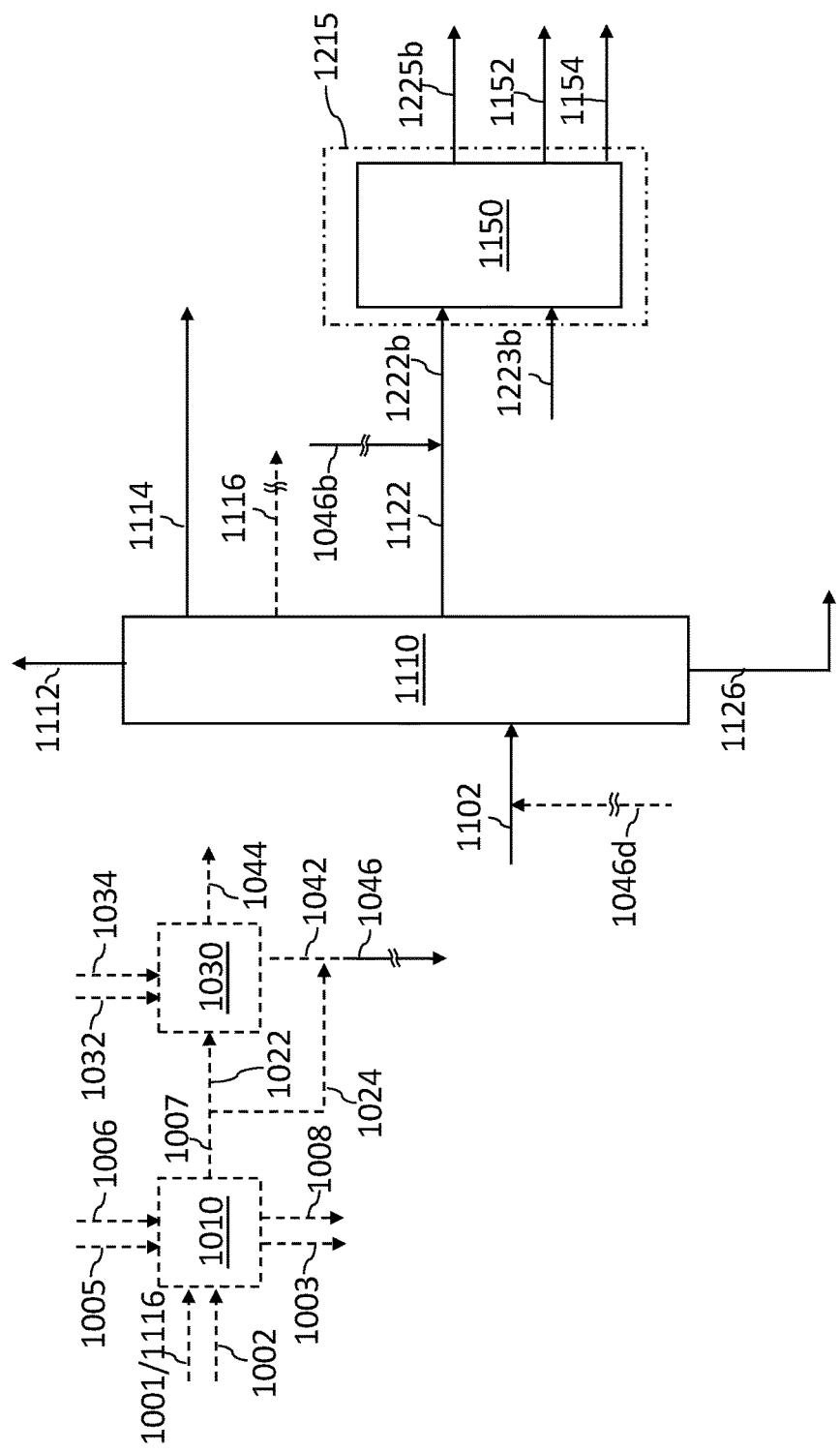
FIG. 5 is a simplified schematic diagram of a middle distillate hydrotreating embodiment of the integrated process of the present disclosure.

With reference to FIG. 5, an embodiment of the process and system includes a separation zone 1110, that includes an ADU, and a hydroprocessing complex 1215 that includes a middle distillate hydrotreating zone (diesel hydrotreating zone) 1150.

A feed 1102 is separated into fractions in a separation zone 1110. In certain embodiments, the feed 1102 can be crude oil that has been subjected to hydrotreating (hydrotreated crude oil), solvent deasphalting (deasphalted oil) or coking, such as delayed coking liquid products, or fluid catalytic cracking unit. The separation zone that includes an ADU is used in well-known arrangements. The feed 1102, is separated into fractions in the separation zone 1110. Light products, for instance, light hydrocarbons with fewer than six carbons, such as, C2-C4 hydrocarbons including ethane, propane and butanes, light ends and LPG 1112 are discharged from separation zone 1110 for optional downstream processing.

Straight run naphtha 1114 and an atmospheric residue fraction 1126 from the separation zone 1110 are separated and discharged from separation zone 1110.

A middle distillate fraction 1122 from the separation zone 1110 is passed to middle distillate hydrotreating zone 1150. Middle distillate fraction 1122 is mixed, optionally in a mixing zone (not shown), with ODSO (or ODSO/DSO) stream 1046b to form an enhanced middle distillates feed 1222b which is sent to one or more inlets of a middle distillate hydrotreating zone 1150 along with a source of hydrogen 1223b. In certain embodiments, ODSO (or ODSO/DSO) stream 1046b is injected into the middle distillate hydrotreater feed pipe that contains middle distillate fraction 1122. In certain embodiments, the mixing can be carried out in a mixing zone by mixing techniques known in the art such as with a separate mixing vessel equipment with a stirrer, an injector and/or an in-line mixer. In certain embodiments, the turbulent flow in the pipe ensures that the streams are well mixed prior to entering the reaction vessel(s). In other embodiments (not shown), middle distillate fraction 1122 and ODSO (or ODSO/DSO) stream 1046b are sent via separate inlets to middle distillate hydrotreating zone 1150 along with a source of hydrogen 1223b. In this embodiment, the middle distillate fraction 1122 and ODSO (or ODSO/DSO) stream 1046b are internally mixed within middle distillate hydrotreating zone 1150 prior to conversion. In each embodiment, the reactants in the reactor in the middle distillate hydrotreating zone 1150 include the middle distillate fraction 1122 and the ODSO (or ODSO/DSO) compounds from stream 1046b.

The middle distillate hydrotreating zone 1150 within the hydroprocessing complex 1215, generally converts an enhanced middle distillates feed 1222b into hydroprocessing products which generally comprise light gases 1225b, naphtha 1152 and a middle distillate fuel fraction 1154, for instance, as a diesel fuel blending component that generally has a sulfur content less than 500 ppmw, 100 ppmw, or 10 ppmw. In some embodiments, naphtha 1152 can be routed to naphtha hydrotreater 1130. In some embodiments, naphtha 1152 can be routed to a gasoline pool or sent to a downstream processor such as a catalytic reformer.

The ODSO components or the combination of the DSO/ODSO components in the enhanced hydroprocessing feed 1222b are converted to hydrogen sulfide, water and alkanes. The light gases 1225 generally includes the hydrogen sulfide and C1-C4 alkanes, including those produced by the reaction of ODSO or ODSO/DSO with hydrogen. The naphtha 1152 generally includes naphtha range products derived from the initial feed and C5-C10 alkanes produced by the reaction of ODSO or ODSO/DSO with hydrogen. Due to the hydrogen partial pressures in the reactor, it is unlikely that any C11+ alkanes will be produced in the conversion, however, any C11+ alkanes that are produced by the combination of R groups produced by the reaction of ODSO or ODSO/DSO with hydrogen would be included in the middle distillate fraction 1154.

In some embodiments, after the conversion step, water is injected into the effluents from the hydroprocessing reactor to dissolve ammonia sulfide formed. Water produced by the reaction of ODSO or ODSO/DSO with hydrogen is in the aqueous phase along with excess injected water. The effluents from the hydroprocessing reactor are sent to an oil/water separation unit (not shown) before distillation within the hydroprocessing reactor to remove water. The alkane produced are derived from the alkyl groups (R-groups) attached to the ODSO or the ODSO/DSO compounds in ODSO (or ODSO/DSO) stream 1046.

In certain embodiments, at least two different middle distillate cuts are separated and discharged from separation zone 1110. A second atmospheric distillation zone middle distillate fraction 1122, in certain embodiments referred to as a diesel fraction, contains heavy kerosene range hydrocarbons and medium AGO range hydrocarbons. An optional first atmospheric distillation zone middle distillate fraction 1116, in certain embodiments referred to as a kerosene fraction, contains light kerosene range hydrocarbons. In another example, an optional first middle distillate fraction 1116 contains kerosene range hydrocarbons and a second middle distillate fraction 1122 contains medium AGO range hydrocarbons. In another example, an optional first middle distillate fraction 1116 contains light kerosene range hydrocarbons and a portion of heavy kerosene range hydrocarbons and a second middle distillate fraction 1122 contains a portion of heavy kerosene range hydrocarbons and a portion of medium AGO range hydrocarbons. The second middle distillate fraction 1122 is processed in the middle distillate hydrotreating zone (middle distillates hydrotreating zone) 1150 using the arrangement shown in FIG. 5. The optional first middle distillate fraction 1116 can be separated and discharged from separation zone 1110 using the arrangement shown in FIG. 5. In certain embodiments the first middle distillate fraction 1116 can be used as a feed to MEROX unit.

In certain optional embodiments, the source of ODSO (or ODSO/DSO) stream 1046b is an integrated MEROX unit 1010 and enhanced MEROX (E-MEROX) unit 1030 (shown in dashed lines) that operate similarly to the those in FIGS. 1-2, with similar references numbers representing similar units/feeds. All or a portion of by-product stream of DSO compounds 1007 from MEROX unit 1010 is sent to E-MEROX unit 1030 via stream 1022 for conversion into an ODSO stream 1042.

In certain embodiments, a portion of the DSO stream 1007, stream 1024, is mixed with ODSO stream 1042 to produce combined DSO/ODSO stream 1046 that is then mixed with second middle distillate fraction 1122.

In certain embodiments, an ODSO (or ODSO/DSO) stream 1046d can be mixed with crude feed 1102. In certain embodiments, a portion of ODSO (or ODSO/DSO) stream 1046 from E-MEROX unit 1030 can be the source of stream 1046d.

Figure 6A:
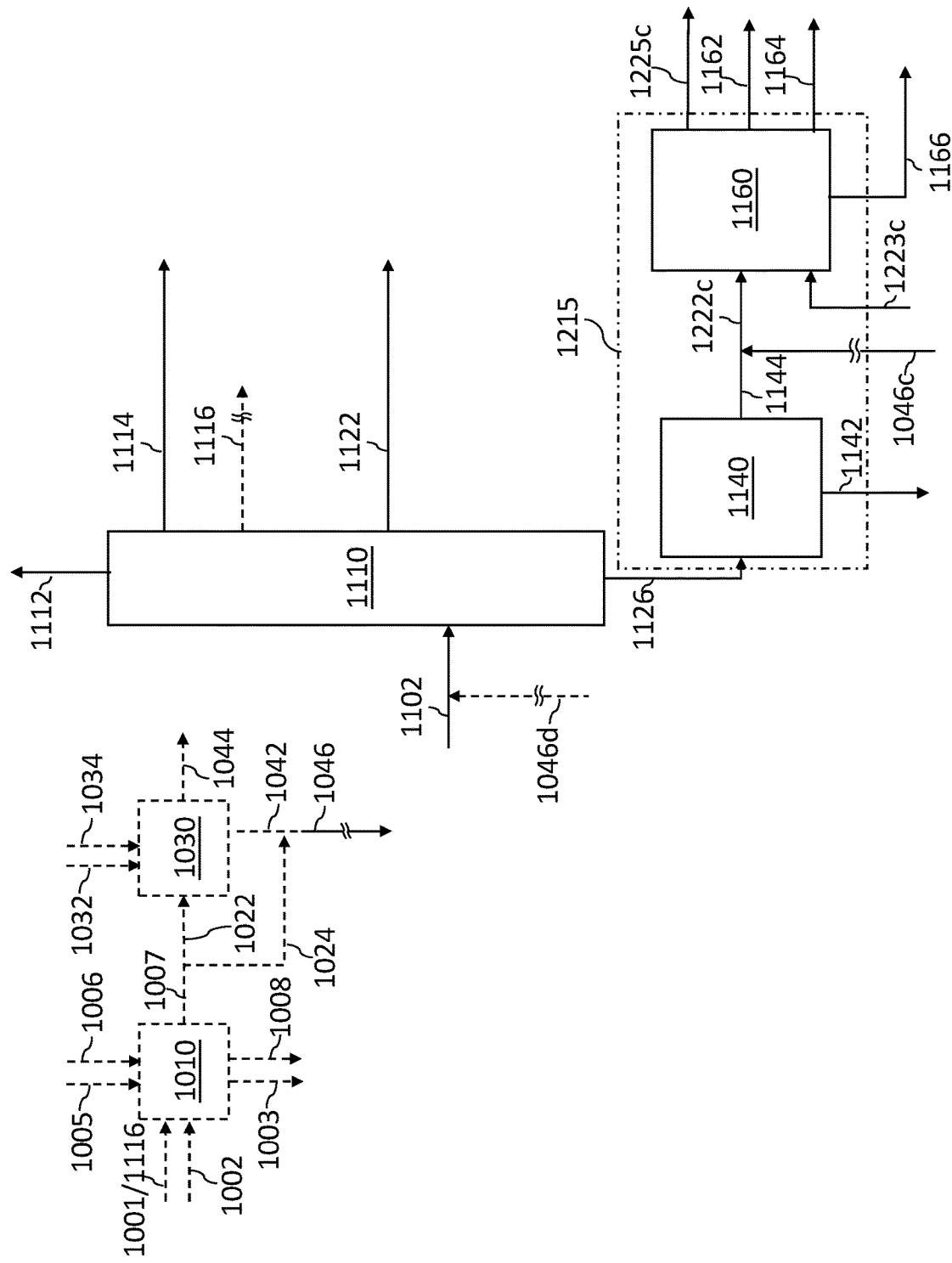
FIG. 6a is a simplified schematic diagram of a vacuum residue hydrocracking embodiment of the integrated process of the present disclosure.

With reference to FIG. 6a, an embodiment of the process and system includes a separation zone 1110, that includes an ADU and a hydroprocessing complex 1215 that includes a vacuum distillation zone ("VDU") 1140 and a vacuum gas oil hydrocracking zone 1160 operating under conditions used in vacuum gas oil hydrocracking.

A feed 1102 is separated into fractions in separation zone 1110. The feed 1102 can be crude oil or condensates, bitumens, biofuels or coal liquefaction products. In certain embodiments, the feed can be crude oil that has been subjected to hydrotreating (hydrotreated crude oil), solvent deasphalting (deasphalted oil) or coking, such as delayed coking liquid products, or fluid catalytic cracking unit. The separation zone that includes an ADU is used in well-known arrangements. The feed 1102, is separated into fractions in the separation zone 1110. Light products, for instance, light hydrocarbons with fewer than six carbons, such as, C2-C4 hydrocarbons including ethane, propane and butanes, light ends and LPG 1112 are discharged from separation zone 1110 for optional downstream processing.

Straight run naphtha 1114 and a middle distillate fraction 1122 from the separation zone 1110 are separated and discharged from separation zone 1110.

In certain embodiments, at least two different middle distillate cuts are separated and discharged from separation zone 1110. A second atmospheric distillation zone middle distillate fraction 1122, in certain embodiments referred to as a diesel fraction, contains heavy kerosene range hydrocarbons and medium AGO range hydrocarbons. An optional first atmospheric distillation zone middle distillate fraction 1116, in certain embodiments referred to as a kerosene fraction, contains light kerosene range hydrocarbons. In another example, an optional first middle distillate fraction 1116 contains kerosene range hydrocarbons and a second middle distillate fraction 1122 contains medium AGO range hydrocarbons. In another example, an optional first middle distillate fraction 1116 contains light kerosene range hydrocarbons and a portion of heavy kerosene range hydrocarbons and a second middle distillate fraction 1122 contains a portion of heavy kerosene range hydrocarbons and a portion of medium AGO range hydrocarbons. The second middle distillate fraction 1122 and optional first middle distillate fraction 1116 can be separated and discharged from separation zone 1110 using the arrangement shown in FIG. 6a. In certain embodiments the first middle distillate fraction 1116 can be used as a feed to MEROX unit.

An atmospheric residue fraction 1126 is passed to a VDU 1140. The atmospheric residue fraction 1126 is separated generally into vacuum gas oil fraction 1144, and a vacuum residue fraction 1142.

Vacuum gas oil 1144 from the vacuum distillation zone 1140 is mixed, optionally in a mixing zone (not shown), with ODSO (or ODSO/DSO) stream 1046c to form an enhanced vacuum gas oil feed 1222c which is routed to the gas oil hydrocracking zone 1160, along with a source of hydrogen 1223c. In certain embodiments, ODSO (or ODSO/DSO) stream 1046c is injected into the gas oil hydrocracking feed pipe that contains vacuum gas oil 1144. In certain embodiments, the mixing can be carried out in a mixing zone by mixing techniques known in the art such as with a separate mixing vessel equipment with a stirrer, an injector and/or an in-line mixer. In certain embodiments, the turbulent flow in the pipe ensures that the streams are well mixed prior to entering the reaction vessel(s). In other embodiments (not shown), vacuum gas oil 1144 and ODSO (or ODSO/DSO) stream 1046c are sent via separate inlets to gas oil hydrocracking zone 1160 along with a source of hydrogen 1223c. In this embodiment, the vacuum gas oil 1144 and ODSO (or ODSO/DSO) stream 1046c are internally mixed within gas oil hydrocracking zone 1160 prior to conversion. In each embodiment, the reactants in the reactor in the gas oil hydrocracking zone 1160 include the vacuum gas oil 1144 and the ODSO (or ODSO/DSO) compounds from stream 1046c.

In addition, the gas oil fractions from the vacuum distillation zone 1140 can include one or more VGO fractions, such as a light vacuum gas oil stream and a heavy vacuum gas oil stream. The gas oil hydrocracking zone 1160 can operate under mild, moderate or severe hydrocracking conditions, and generally produces light gases 1225c, a hydrocracked naphtha fraction 1162, a middle distillate fuel fraction 1164, and an unconverted oil fraction 1166.

In certain embodiments (not shown) ODSO (or ODSO/DSO) stream 1046c to can also be mixed with atmospheric residue fraction 1126 prior to the vacuum distillation zone 1140.

The ODSO components or the combination of the DSO/ODSO components in the enhanced hydroprocessing feed 1222c are converted to hydrogen sulfide, water and alkanes. The light gases 1225c generally includes the hydrogen sulfide and C1-C4 alkanes, including those produced by the reaction of ODSO or ODSO/DSO with hydrogen. The hydrocracked naphtha fraction 1162 generally include the naphtha range products derived from the initial feed and C5-C10 alkanes produced by the reaction of ODSO or ODSO/DSO with hydrogen. Due to the hydrogen partial pressures in the reactor, it is unlikely that any C11+ alkanes will be produced in the conversion, however, any C11+ alkanes that are produced by the combination of R groups produced by the reaction of ODSO or ODSO/DSO with hydrogen would be included in middle distillate fuel fraction 1164.

In some embodiments, after the conversion step, water is injected into the effluents from the hydroprocessing reactor to dissolve ammonia sulfide formed. Water produced by the reaction of ODSO or ODSO/DSO with hydrogen is in the aqueous phase along with excess injected water. The effluents from the hydroprocessing reactor are sent to an oil/water separation unit (not shown) before distillation within the hydroprocessing reactor to remove water. The alkane produced are derived from the alkyl groups (R-groups) attached to the ODSO or the ODSO/DSO compounds in ODSO (or ODSO/DSO) stream 1046.

In certain optional embodiments, the source of ODSO (or ODSO/DSO) stream 1046c is an integrated MEROX unit 1010 and enhanced MEROX (E-MEROX) unit 1030 (shown in dashed lines) that operate similarly to the those in FIGS. 1-2, with similar references numbers representing similar units/feeds. All or a portion of by-product stream of DSO compounds 1007 from MEROX unit 1010 is sent to E-MEROX unit 1030 via stream 1022 for conversion into an ODSO stream 1042.

In certain embodiments, a portion of the DSO stream 1007, stream 1024, is mixed with ODSO stream 1042 to produce combined DSO/ODSO stream 1046 that is then mixed with vacuum gas oil fraction 1144.

In certain embodiments, an ODSO (or ODSO/DSO) stream 1046d can be mixed with crude feed 1102. In certain embodiments, a portion of ODSO (or ODSO/DSO) stream 1046 from E-MEROX unit 1030 can be the source of stream 1046d.

Figure 6B:
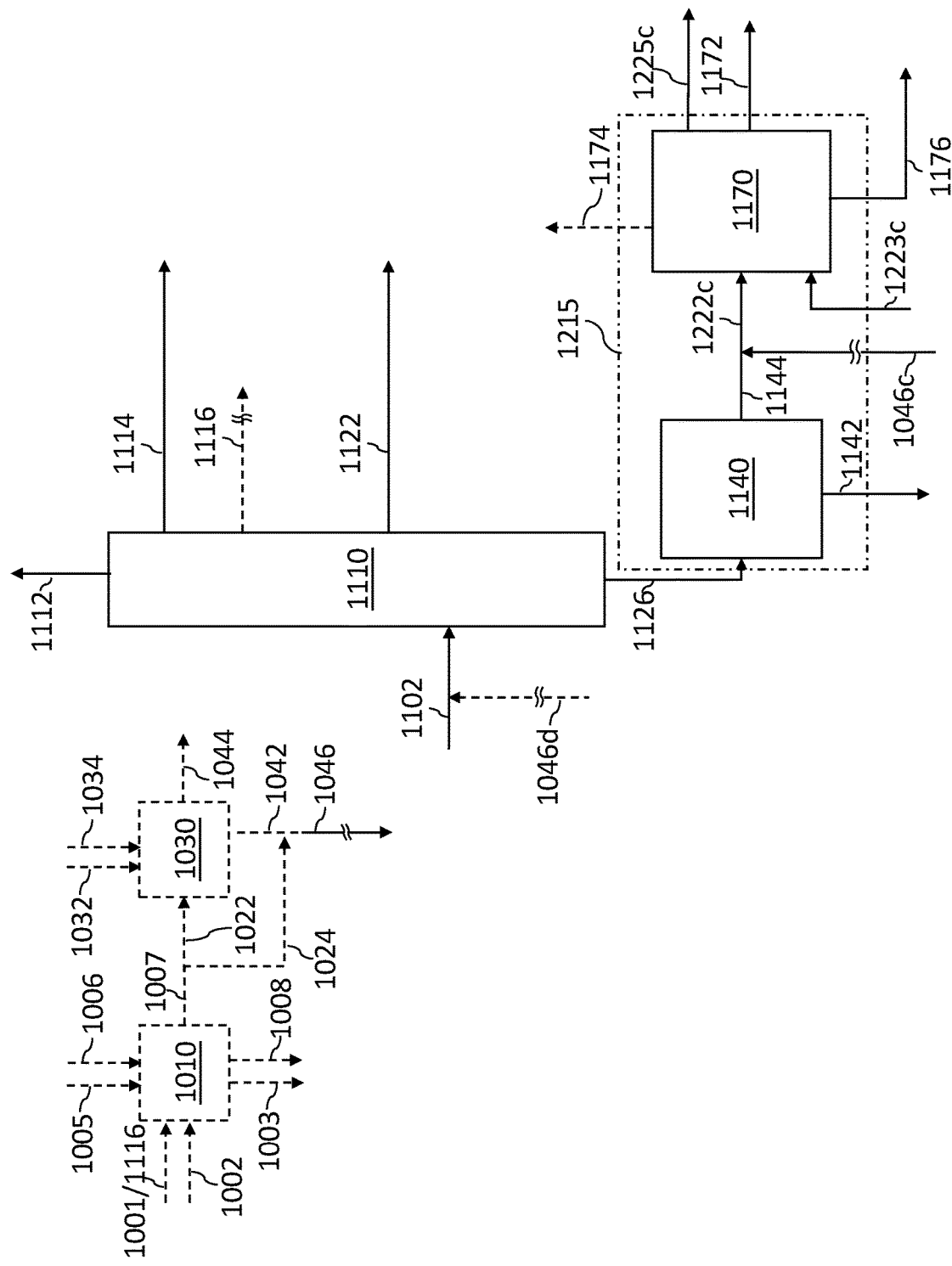
FIG. 6b is a simplified schematic diagram of a vacuum residue hydrotreating embodiment of the integrated process of the present disclosure.

With reference to FIG. 6b, an embodiment of the process and system includes a separation zone 1110, that includes an ADU, and a hydroprocessing complex 1215 that includes a vacuum distillation zone ("VDU") 1140 and a vacuum gas oil hydrotreating zone 1170 operating under conditions used in vacuum gas oil hydrotreating. The embodiment depicted in FIG. 6b operates similarly to the embodiment depicted in FIG. 6a.

The enhanced vacuum gas oil feed 1222c is routed to the gas oil hydrotreating zone 1170, along with a source of hydrogen 1223c. The gas oil hydrotreating zone 1170 can operate under mild, moderate or severe hydrotreating conditions, and generally produces and generally produces light gases 1225c, a hydrotreated gas oil fraction 1176, naphtha and some middle distillates. Naphtha range products can be separated from products within the gas oil hydrotreating zone 1170 as a hydrotreated naphtha stream 1172. Alternatively, or in conjunction with the hydrotreated naphtha stream 1172, a cracked distillates stream 1174 is produced.

In certain embodiments (not shown) ODSO (or ODSO/DSO) stream 1046c to can also be mixed with atmospheric residue fraction 1126 prior to the vacuum distillation zone 1140.

The ODSO components or the combination of the DSO/ODSO components in the enhanced hydroprocessing feed 1222c are converted to hydrogen sulfide, water and alkanes. The light gases 1225c generally includes the hydrogen sulfide and C1-C4 alkanes, including those produced by the reaction of ODSO or ODSO/DSO with hydrogen. The hydrotreated naphtha stream 1172 generally include the naphtha range products derived from the initial feed and C5-C10 alkanes produced by the reaction of ODSO or ODSO/DSO with hydrogen. Due to the hydrogen partial pressures in the reactor, it is unlikely that any C11+ alkanes will be produced in the conversion, however, any C11+ alkanes that are produced by the combination of R groups produced by the reaction of ODSO or ODSO/DSO with hydrogen would be included in the cracked distillates stream 1174.

In some embodiments, after the conversion step, water is injected into the effluents from the hydroprocessing reactor to dissolve ammonia sulfide formed. Water produced by the reaction of ODSO or ODSO/DSO with hydrogen is in the aqueous phase along with excess injected water. The effluents from the hydroprocessing reactor are sent to an oil/water separation unit (not shown) before distillation within the hydroprocessing reactor to remove water. The alkane produced are derived from the alkyl groups (R-groups) attached to the ODSO or the ODSO/DSO compounds in ODSO (or ODSO/DSO) stream 1046.

In certain optional embodiments, the source of ODSO (or ODSO/DSO) stream 1046c is an integrated MEROX unit 1010 and enhanced MEROX (E-MEROX) unit 1030 (shown in dashed lines) that operate similarly to the those in FIGS. 1-2, with similar references numbers representing similar units/feeds. All or a portion of by-product stream of DSO compounds 1007 from MEROX unit 1010 is sent to E-MEROX unit 1030 via stream 1022 for conversion into an ODSO stream 1042.

In certain embodiments, a portion of the DSO stream 1007, stream 1024, is mixed with ODSO stream 1042 to produce combined DSO/ODSO stream 1046 that is then mixed with vacuum gas oil fraction 1144.

In certain embodiments, an ODSO (or ODSO/DSO) stream 1046d can be mixed with crude feed 1102. In certain embodiments, a portion of ODSO (or ODSO/DSO) stream 1046 from E-MEROX unit 1030 can be the source of stream 1046d.

Figure 7A:
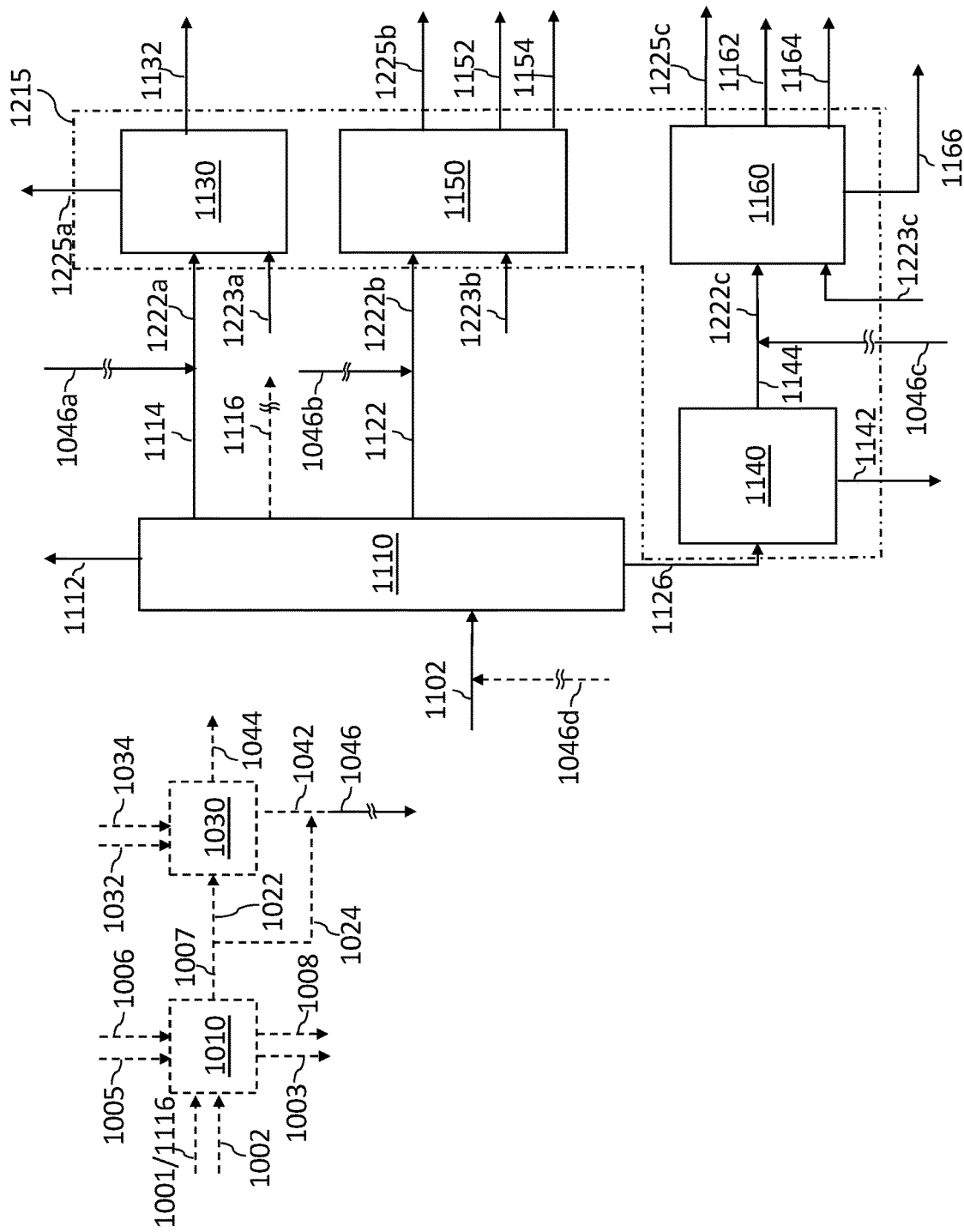
FIG. 7a is a is a simplified schematic diagram of an embodiment of the integrated process of the present disclosure.

With reference to FIG. 7a, an embodiment of the process and system includes a separation zone 1110, that includes an ADU, and a hydroprocessing complex 1215 that includes a naphtha hydrotreater 1130, a middle distillate hydrotreating zone (middle distillates hydrotreating zone) 1150, a vacuum distillation zone ("VDU") 1140 and a gas oil hydrocracking zone 1160 operating under conditions used in vacuum gas oil hydrotreating.

A feed 1102 is separated into fractions in separation zone 1110. The feed 1102 can be crude oil or condensates, bitumens, biofuels or coal liquefaction products. In certain embodiments, the feed can be crude oil that has been subjected to hydrotreating (hydrotreated crude oil), solvent deasphalting (deasphalted oil) or coking, such as delayed coking liquid products, or fluid catalytic cracking unit. The separation zone that includes an ADU is used in well-known arrangements. The feed 1102, is separated into fractions in the separation zone 1110. Light products, for instance, light hydrocarbons with fewer than six carbons, such as, C2-C4 hydrocarbons including ethane, propane and butanes, light ends and LPG 1112 are discharged from separation zone 1110 for optional downstream processing.

Straight run naphtha 1114 from the separation zone 1110 is passed to the naphtha hydrotreater 1130. Naphtha 1114 is mixed, optionally in a mixing zone (not shown), with ODSO (or ODSO/DSO) stream 1046a to form an enhanced naphtha feed 1222a which is sent to one or more inlets of a naphtha hydrotreater 1130 along with a source of hydrogen 1223a. In certain embodiments, ODSO (or ODSO/DSO) stream 1046a is injected into the naphtha hydrotreater feed pipe that contains naphtha 1114. In certain embodiments, the mixing can be carried out in a mixing zone by mixing techniques known in the art such as with a separate mixing vessel equipment with a stirrer, an injector and/or an in-line mixer. In certain embodiments, the turbulent flow in the pipe ensures that the streams are well mixed prior to entering the reaction vessel(s). In other embodiments (not shown), naphtha 1114 and ODSO (or ODSO/DSO) stream 1046a are sent via separate inlets to naphtha hydrotreater 1130 along with a source of hydrogen 1223a. In this embodiment, the naphtha 1114 and ODSO (or ODSO/DSO) stream 1046a are internally mixed within naphtha hydrotreater 1130 prior to conversion. In each embodiment, the reactants in the reactor in the naphtha hydrotreater 1130 include the naphtha 1114 and the ODSO (or ODSO/DSO) compounds from stream 1046a.

The naphtha hydrotreater 1130 within the hydroprocessing complex 1215, generally converts an enhanced naphtha feed 1222a into hydroprocessing products which generally comprise light gases 1225a and hydrotreated naphtha products 1132.

A middle distillate fraction 1122 from the separation zone 1110 is passed to middle distillate hydrotreating zone 1150. Middle distillate fraction 1122 is mixed, optionally in a mixing zone (not shown), with ODSO (or ODSO/DSO) stream 1046b to form an enhanced middle distillates feed 1222b which is sent to one or more inlets of a middle distillate hydrotreating zone 1150 along with a source of hydrogen 1223b. In certain embodiments, ODSO (or ODSO/DSO) stream 1046b is injected into the middle distillate hydrotreater feed pipe that contains middle distillate fraction 1122. In certain embodiments, the mixing can be carried out in a mixing zone by mixing techniques known in the art such as with a separate mixing vessel equipment with a stirrer, an injector and/or an in-line mixer. In certain embodiments, the turbulent flow in the pipe ensures that the streams are well mixed prior to entering the reaction vessel(s). In other embodiments (not shown), middle distillate fraction 1122 and ODSO (or ODSO/DSO) stream 1046b are sent via separate inlets to middle distillate hydrotreating zone 1150 along with a source of hydrogen 1223b. In this embodiment, the middle distillate fraction 1122 and ODSO (or ODSO/DSO) stream 1046b are internally mixed within middle distillate hydrotreating zone 1150 prior to conversion. In each embodiment, the reactants in the reactor in the middle distillate hydrotreating zone 1150 include the middle distillate fraction 1122 and the ODSO (or ODSO/DSO) compounds from stream 1046b.

The middle distillate hydrotreating zone 1150 within the hydroprocessing complex 1215, generally converts an enhanced middle distillates feed 1222b into hydroprocessing products which generally comprise light gases 1225b, naphtha 1152 and a middle distillate fuel fraction 1154, for instance, as a middle distillate fuel blending component that generally has a sulfur content less than 500 ppmw, 100 ppmw, or 10 ppmw. In some embodiments, naphtha 1152 can be routed to naphtha hydrotreater 1130. In some embodiments, naphtha 1152 can be routed to a gasoline pool or sent to a downstream processor such as a catalytic reformer.

In certain embodiments, at least two different middle distillate cuts are separated and discharged from separation zone 1110. A second atmospheric distillation zone middle distillate fraction 1122, in certain embodiments referred to as a diesel fraction, contains heavy kerosene range hydrocarbons and medium AGO range hydrocarbons. An optional first atmospheric distillation zone middle distillate fraction 1116, in certain embodiments referred to as a kerosene fraction, contains light kerosene range hydrocarbons. In another example, an optional first middle distillate fraction 1116 contains kerosene range hydrocarbons and a second middle distillate fraction 1122 contains medium AGO range hydrocarbons. In another example, an optional first middle distillate fraction 1116 contains light kerosene range hydrocarbons and a portion of heavy kerosene range hydrocarbons and a second middle distillate fraction 1122 contains a portion of heavy kerosene range hydrocarbons and a portion of medium AGO range hydrocarbons. The second middle distillate fraction 1122 is processed in the middle distillate hydrotreating zone (middle distillates hydrotreating zone) 1150 using the arrangement shown in FIG. 7a. The optional first middle distillate fraction 1116 can be separated and discharged from separation zone 1110 using the arrangement shown in FIG. 7a. In certain embodiments the first middle distillate fraction 1116 can be used as a feed to MEROX unit.

An atmospheric residue fraction 1126 is passed to a VDU 1140. The atmospheric residue fraction 1126 is separated generally into vacuum gas oil fraction 1144, and a vacuum residue fraction 1142.

Vacuum gas oil 1144 from the vacuum distillation zone 1140 is mixed, optionally in a mixing zone (not shown), with ODSO (or ODSO/DSO) stream 1046c to form an enhanced vacuum gas oil feed 1222c which is routed to the gas oil hydrocracking zone 1160, along with a source of hydrogen 1223c. In certain embodiments, ODSO (or ODSO/DSO) stream 1046c is injected into the gas oil hydrocracking feed pipe that contains vacuum gas oil 1144. In certain embodiments, the mixing can be carried out in a mixing zone by mixing techniques known in the art such as with a separate mixing vessel equipment with a stirrer, an injector and/or an in-line mixer. In certain embodiments, the turbulent flow in the pipe ensures that the streams are well mixed prior to entering the reaction vessel(s). In other embodiments (not shown), vacuum gas oil 1144 and ODSO (or ODSO/DSO) stream 1046c are sent via separate inlets to gas oil hydrocracking zone 1160 along with a source of hydrogen 1223c. In this embodiment, the vacuum gas oil 1144 and ODSO (or ODSO/DSO) stream 1046c are internally mixed within gas oil hydrocracking zone 1160 prior to conversion. In each embodiment, the reactants in the reactor in the gas oil hydrocracking zone 1160 include the vacuum gas oil 1144 and the ODSO (or ODSO/DSO) compounds from stream 1046c.

In addition, the gas oil fractions from the vacuum distillation zone 1140 can include one or more VGO fractions, such as a light vacuum gas oil stream and a heavy vacuum gas oil stream. The gas oil hydrocracking zone 1160 can operate under mild, moderate or severe hydrocracking conditions, and generally produces light gases 1225c, a hydrocracked naphtha fraction 1162, a middle distillate fuel fraction 1164, and an unconverted oil fraction 1166.

In certain embodiments (not shown) ODSO (or ODSO/DSO) stream 1046c to can also be mixed with atmospheric residue fraction 1126 prior to the vacuum distillation zone 1140.

The ODSO components or the combination of the DSO/ODSO components in the enhanced naphtha feed 1222a, the enhanced middle distillates feed 1222b, and the enhanced atmospheric residue 1222c convert to hydrogen sulfide, water and alkanes. The light gases 1225a, 1225b and 1225c generally includes the hydrogen sulfide and C1-C4 alkanes, including those produced by the reaction of ODSO or ODSO/DSO with hydrogen. The hydrotreated naphtha products 1132, naphtha 1152 and hydrocracked naphtha fraction 1162 generally include the naphtha range products derived from the initial feed and C5-C10 alkanes produced by the reaction of ODSO or ODSO/DSO with hydrogen. Due to the hydrogen partial pressures in the reactor, it is unlikely that any C11+ alkanes will be produced in the conversion, however, any C11+ alkanes that are produced by the combination of R groups produced by the reaction of ODSO or ODSO/DSO with hydrogen would be included in the middle distillate fuel fraction 1154 and middle distillate fuel fraction 1164.

In some embodiments, after the conversion step, water is injected into the effluents from the hydroprocessing reactor to dissolve ammonia sulfide formed. Water produced by the reaction of ODSO or ODSO/DSO with hydrogen is in the aqueous phase along with excess injected water. The effluents from the hydroprocessing reactor are sent to an oil/water separation unit (not shown) before distillation within the hydroprocessing reactor to remove water. The alkane produced are derived from the alkyl groups (R-groups) attached to the ODSO or the ODSO/DSO compounds in ODSO (or ODSO/DSO) stream 1046.

Figure 7B:
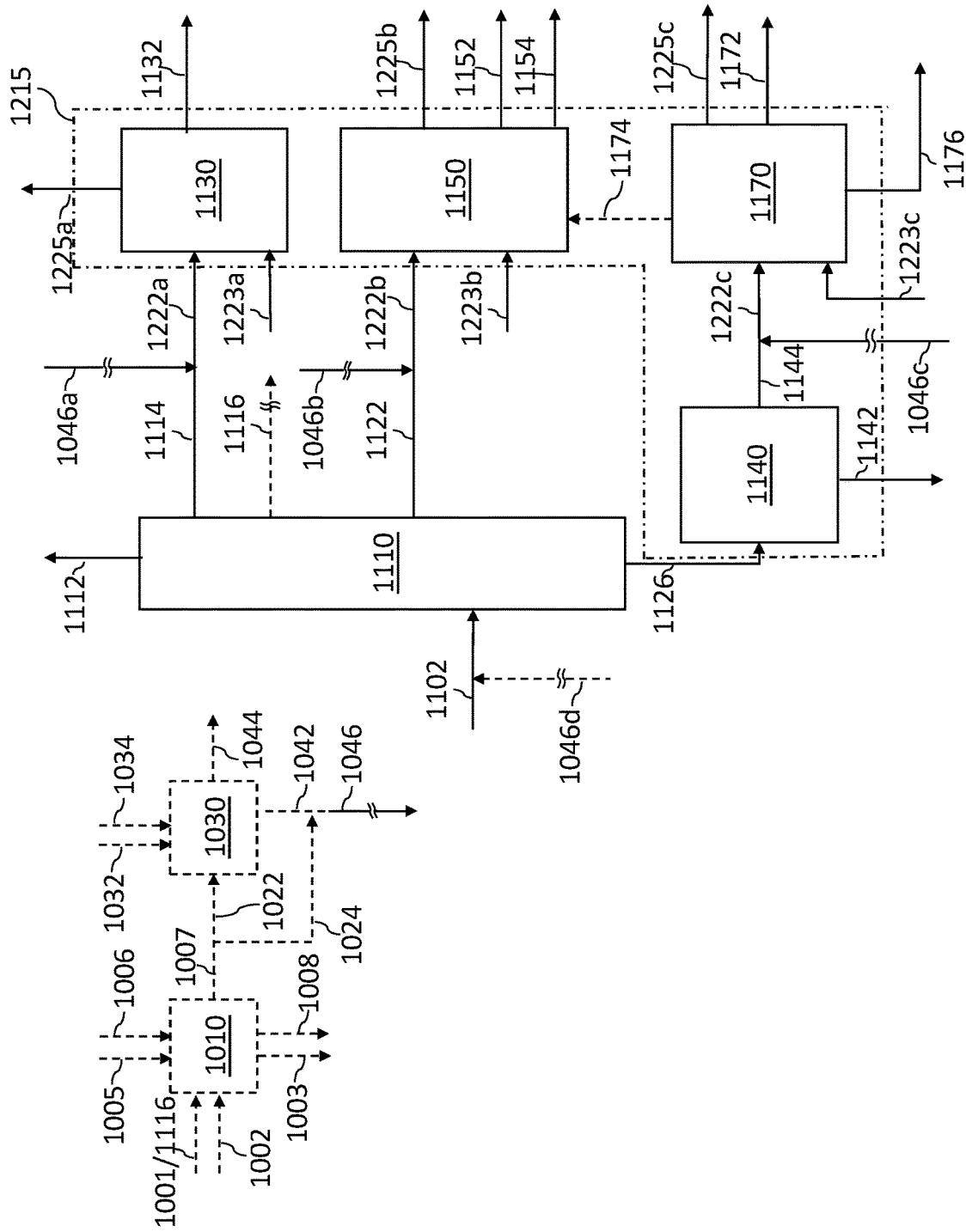
FIG. 7b is a is a simplified schematic diagram of an embodiment of the integrated process of the present disclosure.

With reference to FIG. 7b, an embodiment of the process and system includes a separation zone 1110, that includes an ADU, and a hydroprocessing complex 1215 that includes a vacuum distillation zone ("VDU") 1140 and a vacuum gas oil hydrotreating zone 1170 operating under conditions used in vacuum gas oil hydrotreating. The embodiment depicted in FIG. 7b operates similarly to the embodiment depicted in FIG. 7a.

The enhanced vacuum gas oil feed 1222c is routed to the gas oil hydrotreating zone 1170, along with a source of hydrogen 1223c. The gas oil hydrotreating zone 1170 can operate under mild, moderate or severe hydrotreating conditions, and generally produces and generally produces light gases 1225c, a hydrotreated gas oil fraction 1176, naphtha and some middle distillates. Naphtha range products can be separated from products within the gas oil hydrotreating zone 1170 as a hydrotreated naphtha stream 1172. Alternatively, or in conjunction with the hydrotreated naphtha stream 1172, a cracked distillates stream 1174 is produced.

In some embodiments, the cracked distillates stream 1174 containing hydrotreated distillates (and in certain embodiments naphtha range products) are routed to middle distillate hydrotreating zone 1150 for further hydroprocessing and/or separation into middle distillate hydrotreating zone 1150 products.

The ODSO components or the combination of the DSO/ODSO components in the enhanced naphtha feed 1222a, the enhanced middle distillates feed 1222b, and the enhanced atmospheric residue 1222c convert to hydrogen sulfide, water and alkanes. The light gases 1225a, 1225b and 1225c generally includes the hydrogen sulfide and C1-C4 alkanes, including those produced by the reaction of ODSO or ODSO/DSO with hydrogen. The hydrotreated naphtha products 1132, naphtha 1152 and the hydrotreated naphtha stream 1172 generally include the naphtha range products derived from the initial feed and C5-C10 alkanes produced by the reaction of ODSO or ODSO/DSO with hydrogen. Due to the hydrogen partial pressures in the reactor, it is unlikely that any C11+ alkanes will be produced in the conversion, however, any C11+ alkanes that are produced by the combination of R groups produced by the reaction of ODSO or ODSO/DSO with hydrogen would be included in the middle distillate fuel fraction 1154 and cracked distillates stream 1174.

In some embodiments, after the conversion step, water is injected into the effluents from the hydroprocessing reactor to dissolve ammonia sulfide formed. Water produced by the reaction of ODSO or ODSO/DSO with hydrogen is in the aqueous phase along with excess injected water. The effluents from the hydroprocessing reactor are sent to an oil/water separation unit (not shown) before distillation within the hydroprocessing reactor to remove water. The alkane produced are derived from the alkyl groups (R-groups) attached to the ODSO or the ODSO/DSO compounds in ODSO (or ODSO/DSO) stream 1046.

In certain optional embodiments of either FIG. 7a or 7b, the source of one or more of ODSO (or ODSO/DSO) streams 1046a, 1046b, or 1046c is an integrated MEROX unit 1010 and enhanced MEROX (E-MEROX) unit 1030 (shown in dashed lines) that operate similarly to the those in FIGS. 1-2, with similar references numbers representing similar units/feeds. All or a portion of by-product stream of DSO compounds 1007 from MEROX unit 1010 is sent to E-MEROX unit 1030 via stream 1022 for conversion into an ODSO stream 1042.

In certain embodiments, a portion of the DSO stream 1007, stream 1024, is mixed with ODSO stream 1042 to produce combined DSO/ODSO stream 1046 that is the source of one or more of ODSO (or ODSO/DSO) streams 1046a, 1046b, or 1046c.

In certain embodiments, an ODSO (or ODSO/DSO) stream 1046d can be mixed with crude feed 1102. In certain embodiments, a portion of ODSO (or ODSO/DSO) stream 1046 from E-MEROX unit 1030 can be the source of stream 1046d.

In certain embodiments, the ratio of ODSO to DSO in streams 1046, 1046a, 1046b, 1046c and/or 1046d (generally referred to as stream 1046) can be in the range of from 100:0 to 0.001:99.999. In certain embodiments, a substantial portion of the DSO/ODSO stream 1046 comprises ODSO compounds and a minor portion of the DSO/ODSO stream 1046 comprises DSO compounds, for example, the ratio of ODSO to DSO in stream 1046 can be in the range of from 100:0 to 99:1 or 100:0 to 95:5, or 100:0 to 90:10 V %. In certain embodiments, a significant portion of the DSO/ODSO stream 1046 comprises ODSO compounds and a minor portion of the DSO/ODSO stream 1046 comprises DSO compounds, for example, the ratio of ODSO to DSO in stream 1046 can be in the range of from 100:0 to 80:20 or 100:0 to 75:25 V %. In certain embodiments, a major portion of the DSO/ODSO stream 1046 comprises ODSO compounds and a minor portion of the DSO/ODSO stream 1046 comprises DSO compounds, for example, the ratio of ODSO to DSO in stream 1046 can be in the range of from 100:0 to 60:40 or 100:0 to 50:50 V %. In certain embodiments, the DSO/ODSO stream comprises one or more oxidized disulfide compounds and one or more disulfide compounds.

In certain embodiments, there is no DSO stream that is mixed with the ODSO stream and therefore the ratio of ODSO to DSO in stream 1046 is 100:0 V %.

In certain embodiments, the ratio of ODSO stream or ODSO/DSO stream to hydroprocessing feed is in the range of from 10-50,000 ppmw, 10-10,000 ppmw, 10-1,000 ppmw, 10-500 ppmw, 10-300 ppmw, or 10-100 ppmw.

In certain embodiments, the ODSO compounds in the ODSO or ODSO/DSO stream are derived from an effluent refinery hydrocarbon stream recovered downstream of an E-MEROX process. In certain embodiments, the DSO compounds in the ODSO/DSO stream are derived from an effluent refinery hydrocarbon stream recovered downstream of an MEROX process.

In certain embodiments, the ODSO compounds in stream 1046 are converted to extinction. In certain embodiments, the DSO compounds in stream 1046 are converted to extinction.

In certain embodiments, the ODSO compounds in the ODSO or ODSO/DSO stream comprises at least one of the following ODSO compounds:

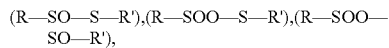

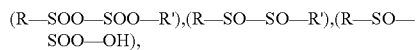

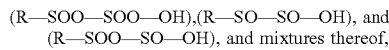

where R and R' are alkyl groups comprising 1-10 carbon atoms.

In certain embodiments, the number of carbon atoms in the DSO or ODSO compound is in the range of from 2 to 20. In certain embodiments, the number of sulfur atoms in the DSO or ODSO compound is in the range of from 1 to 3.

In certain embodiments, the alkanes produced correspond to the R-groups of the DSO and/or ODSO compounds and include C1-10 alkanes.

In certain embodiments, the R-groups of the DSO and/or ODSO compounds can be straight, branched, or cyclic, and the chains can be saturated or unsaturated.

Without wishing to be bound by theory, it has been hypothesized that the production of hydrogen sulfide and alkanes occurs according to the following:

for ODSO compounds present in the hydroprocessing feed:

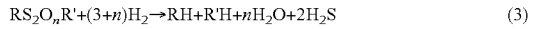 (3)

and for DSO compounds present in the hydroprocessing feed:

 (4).

This means that 1 mole of ODSO compounds, that comprise n moles of oxygen, will produce two moles of alkanes (one mole of RH and one mole of R'H), 2 moles of hydrogen sulfide and n moles of water. Similarly, 1 mole of DSO will produce two moles of alkanes (one mole of RH and one mole of R'H) and 2 moles of hydrogen sulfide. As described herein, the alkanes produced by the reaction of ODSO or ODSO/DSO with hydrogen will pass with the reaction products having a similar boiling temperature range and the hydrogen sulfide produced by the reaction of ODSO or ODSO/DSO with hydrogen will pass with other hydrogen sulfide and other gases produced in the reaction.

In certain embodiments, the naphtha hydrotreating zone 1130 operating conditions include:

a reactor temperature (° C.) in the range of from about 250-350, 355-375, 355-385, 370-400 or 360-390;

a reaction inlet pressure (barg) in the range of from about 10-50, 48-52, 48-55, 50-55 or 50-60;

a hydrogen treat gas feed rate (SLt/Lt) up to about 500, in certain embodiments from about 100-500, 100-400, or 100-300.

Effective straight run naphtha reactor catalyst includes those possessing hydrotreating functionality and which generally contain one or more active metal component of metals or metal compounds (oxides or sulfides) selected from the Periodic Table of the Elements IUPAC Groups 6-10. In certain embodiments, the active metal component is one or more of cobalt, nickel, tungsten and molybdenum. The active metal component is typically deposited or otherwise incorporated on a support, such as amorphous alumina or silica or titania or combinations thereof. The catalyst used in the hydrotreating zone can include one or more catalyst selected from cobalt/molybdenum, nickel/molybdenum, nickel/tungsten, and cobalt/nickel/molybdenum. Combinations of one or more of cobalt/molybdenum, nickel/molybdenum, nickel/tungsten and cobalt/nickel/molybdenum, can also be used. The combinations can be composed of different particles containing a single active metal species, or particles containing multiple active species. In certain embodiments, cobalt/molybdenum hydrodesulfurization catalyst is suitable. Effective liquid hourly space velocity values ($h^{-1}$), on a fresh feed basis relative to the hydrotreating catalysts, are in the range of from about 0.3-10.0, 0.3-5.0, 0.3-2.0, 0.5-10.0, 0.5-5.0, 0.5-2.0 or 0.8-1.2. Suitable hydrotreating catalysts used in the hydrotreating zone 1130 have an expected lifetime in the range of about 28-44, 34-44, 28-38 or 34-38 months.

One or more outlets of the reaction zone of the naphtha hydrotreating zone 1130 that discharge an effluent stream are in fluid communication with one or more inlets of a one or more high pressure and/or low pressure separation stages for recovery of recycle hydrogen, wherein the naphtha products are derived from the liquid bottoms from the final low pressure stage.

In certain embodiments, the middle distillate hydrotreating zone 1150 operating conditions include:

a reactor temperature (° C.) in the range of from about 270-450, 300-450, 320-450, 340-450, 270-435, 300-435, 320-435, 340-435, 270-400, 300-400, 320-400, 340-400, 270-380, 300-380, 320-380, 340-360, 270-360, 300-360, 320-360 or 340-360;

a hydrogen partial pressure (barg) in the range of from about 30-80, 30-70, 30-60, 35-80, 35-70, 35-60, 40-80, 40-70 or 40-60;

a hydrogen gas feed rate (standard liters per liter of hydrocarbon feed, SLt/Lt) of up to about 1000, 700 or 500, in certain embodiments from about 200-1000, 200-700, 200-500, 250-1000, 250-700, 250-500, 300-1000, 300-700 or 300-500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.5-10.0, 0.5-5.0, 0.5-2.0, 0.8-10.0, 0.8-6.0, 0.8-5.0, 0.8-4.0, 0.8-2.0, 1.0-10.0, 1.0-6.0, 1.0-5.0, 1.0-4.0 or 1.0-2.0.

An effective quantity of hydrotreating catalyst is provided in the middle distillate hydrotreating zone 1150, including those possessing hydrotreating functionality, including hydrodesulfurization and/or hydrodenitrification, to remove sulfur, nitrogen and other contaminants. Suitable hydrotreating catalysts (sometimes referred to in the industry as "pretreat catalyst") contain one or more active metal component of metals or metal compounds (oxides or sulfides) selected from the Periodic Table of the Elements IUPAC Groups 6, 7, 8, 9 and 10. One or more active metal component(s) are typically deposited or otherwise incorporated on a support, which can include alumina, silica alumina, silica, titania, titania-silica, titania-silicates or combinations including at least one of the foregoing support materials. In certain embodiments, the active metal or metal compound is one or more of Co, Ni, W and Mo, including combinations such as one or more active metals or metal compounds selected from Co/Mo, Ni/Mo, Ni/W, and Co/Ni/Mo. Combinations of one or more of Co/Mo, Ni/Mo, Ni/W and Co/Ni/Mo can also be used, for instance, in plural beds or separate reactors in series. The combinations can be composed of different particles containing a single active metal species, or particles containing multiple active species. In certain embodiments, the catalyst particles have a pore volume in the range of about (cc/gm) 0.15-1.70, 0.15-1.50, 0.30-1.50 or 0.30-1.70; a specific surface area in the range of about ($m^2$/g) 100-400, 100-350, 100-300, 150-400, 150-350, 150-300, 200-400, 200-350 or 200-300; and an average pore diameter of at least about 10, 50, 100, 200, 500 or 1000 angstrom units. The active metal(s) or metal compound(s) are incorporated in an effective concentration, for instance, in the range of (wt % based on the mass of the oxides, sulfides or metals relative to the total mass of the catalysts) 1-40, 1-30, 1-10, 1-5, 2-40, 2-30, 2-10, 3-40, 3-30 or 3-10.

In certain embodiments, an effective quantity of a grading material is added to remove contaminants such as iron sulfide. In certain embodiments, an effective quantity of hydrodewaxing catalyst is also added to improve cloud point and pour point, generally by conversion of normal paraffins into isoparaffins. In such embodiments, effective hydrodewaxing catalysts include those typically used for isomerizing and cracking paraffinic hydrocarbon feeds to improve cold flow properties, such as catalysts comprising Ni, W, or molecular sieves or combinations thereof. Catalyst comprising Ni/W, zeolite with medium or large pore sizes, or a combination thereof are suitable, along with catalyst comprising aluminosilicate molecular sieves such as zeolites with medium or large pore sizes. Effective commercial zeolites include for instance ZSM-5, ZSM-11, ZSM-12, ZSM-22, ZSM-23, ZSM 35, and zeolites of type beta and Y. Hydrodewaxing catalyst is typically supported on an oxide support such as $Al_2O_3$, $SiO_2$, $ZrO_2$, zeolites, zeolite-alumina, alumina-silica, alumina-silica-zeolite, activated carbon, and mixtures thereof. Effective liquid hourly space velocity values ($h^{-1}$), on a fresh feed basis relative to the hydrodewaxing catalyst, are in the range of from about 0.1-12.0, 0.1-8.0, 0.1-4.0, 0.5-12.0, 0.5-8.0, 0.5-4.0, 1.0-12.0, 1.0-8.0, 1.0-4.0 or 1.6-2.4.

One or more outlets of the reaction zone of the middle distillate hydrotreating zone 1150 that discharge an effluent stream are in fluid communication with one or more inlets of a fractionating zone having outlets for the naphtha stream 1152 and the middle distillate stream 1154 (typically including one or more high pressure and/or low pressure separation stages therebetween for recovery of recycle hydrogen), wherein the naphtha and middle distillate products are derived from the liquid bottoms from the final low pressure stage.

In certain embodiments, gas oil hydrocracking zone 1160 can operate as one of the three major hydrocracking process schemes that includes single-stage once through hydrocracking, series-flow hydrocracking with or without recycle, and two-stage recycle hydrocracking. Single-stage once through hydrocracking is the simplest of the hydrocracker configuration and typically occurs at operating conditions that are more severe than hydrotreating processes, and less severe than conventional higher pressure hydrocracking processes. It uses one or more reactors for both treating steps and cracking reaction, so the catalyst must be capable of both hydrotreating and hydrocracking. This configuration is cost effective, but typically results in relatively low product yields (for example, a maximum conversion rate of about 50 wt %). Single stage hydrocracking is often designed to maximize mid-distillate yield over a single or dual catalyst systems. Dual catalyst systems can be used in a stacked-bed configuration or in two different reactors. The effluents are passed to a fractionator column to separate the $H_2S$, $NH_3$, light gases ($C_1$-$C_4$), naphtha and middle distillate products, boiling in the temperature range including and below atmospheric gas oil range fractions (for instance in the temperature range of 36-370° C.). The hydrocarbons boiling above the atmospheric gas oil range (for instance 370° C.) are typically unconverted oils.

One or more outlets of the reaction zone of the gas oil hydrocracking zone 1160 that discharge an effluent stream are in fluid communication with one or more inlets of a fractionating zone having outlets for the hydrocracked naphtha fraction 1162, a middle distillate fuel fraction 1164, and an unconverted oil fraction 1166 (typically including one or more high pressure and/or low pressure separation stages therebetween for recovery of recycle hydrogen), wherein the hydrocracked naphtha fraction, middle distillate fuel fraction, and an unconverted oil fraction products are derived from the liquid bottoms from the final low pressure stage.

Vacuum gas oil hydrocracking zone 1160 can operate under mild, moderate or severe conditions, depending on factors including the feedstock and the desired degree of conversion. Such conditions are effective for removal of a significant amount of the sulfur and other known contaminants, and for conversion of the feed(s) into a major proportion of hydrocracked products and minor proportions of off-gases, light ends and unconverted product. A suitable vacuum gas oil hydrocracker zone 1160 can include, but is not limited to, systems based on technology commercially available from Honeywell UOP, US; Chevron Lummus Global LLC (CLG), US; Axens, FR; Shell Catalysts & Technologies, US, or Haldor Topsoe, DK.

The gas oil hydrocracking zone 1160 can contain one or more fixed-bed, ebullated-bed, slurry-bed, moving bed, continuous stirred tank (CSTR) or tubular reactors, in series and/or parallel arrangement, and is operated under conditions effective for gas oil hydrocracking, the particular type of reactor, the feed characteristics, the desired product slate and the catalyst selection. Additional equipment, including exchangers, furnaces, feed pumps, quench pumps, and compressors to feed the reactor(s) and maintain proper operating conditions, are well known and are considered part of the gas oil hydrocracking zone 1160. In addition, equipment, including pumps, compressors, high temperature separation vessels, low temperature separation vessels and the like to separate reaction products and provide hydrogen recycle within the gas oil hydrocracking zone 1160, are well known and are considered part of the gas oil hydrocracking zone 1160.

Series-flow hydrocracking with or without recycle is one of the most commonly used configurations. It uses one reactor (containing both treating and cracking catalysts) or two or more reactors for both treating and cracking reaction steps. In a series-flow configuration the entire hydrocracked product stream from the first reaction zone, including light gases (typically $C_1$-$C_4$, $H_2S$, $NH_3$) and all remaining hydrocarbons, are sent to the second reaction zone. Unconverted bottoms from the fractionator column are recycled back into the first reactor for further cracking. This configuration converts heavy crude oil fractions such as vacuum gas oil, into light products and has the potential to maximize the yield of naphtha, kerosene and/or middle distillate range hydrocarbons, depending on the recycle cut point used in the distillation section.

Two-stage recycle hydrocracking uses two reactors and unconverted bottoms from the fractionation column are passed to the second reactor for further cracking. Since the first reactor accomplishes both hydrotreating and hydrocracking, the feed to the second reactor is virtually free of ammonia and hydrogen sulfide. This permits the use of high performance zeolite catalysts which are susceptible to poisoning by sulfur or nitrogen compounds.

Effective hydrocracking catalyst generally contain about 5-40 wt % based on the weight of the catalyst, of one or more active metal component of metals or metal compounds (oxides or sulfides) selected from the Periodic Table of the Elements IUPAC Groups 6, 7, 8, 9 and 10. In certain embodiments, the active metal component is one or more of Mo, W, Co or Ni. The active metal component is typically deposited or otherwise incorporated on a support, such as amorphous alumina, amorphous silica alumina, zeolites, or combinations thereof. In certain embodiments, alone or in combination with the above metals, Pt group metals such as Pt and/or Pd, may be present as a hydrogenation component, generally in an amount of about 0.1-2 wt % based on the weight of the catalyst.

Exemplary products from the gas oil hydrocracking zone 1160 include 27-99, 27-90, 27-82, 27-80, 27-75, 27-52, 27-48, 30-99, 30-90, 30-82, 30-80, 30-75, 30-52, 30-48, 48-99, 48-90, 48-82, 48-80, 48-75, 48-52, 78-99, 78-90, 78-85, 80-90 or 80-99 wt % of effluent (relative to the feed to the gas oil hydrocracking zone 1160) boiling at or below the atmospheric residue end boiling point, such as 370° C., including LPG, kerosene, naphtha, and atmospheric gas oil range components. The remaining bottoms fraction is the unconverted oil fraction.

In certain embodiments, a gas oil hydrocracking zone 1160 operates as a once-through single reactor hydrocracking system, and typically includes a reaction zone and a fractionating zone, which can serve as a mild conversion or partial conversion hydrocracker. A reaction zone in a once-through single reactor system generally includes one or more inlets in fluid communication with the feedstock 1144, and a source of hydrogen gas. One or more outlets of reaction zone that discharge an effluent stream are in fluid communication with one or more inlets of the fractionating zone (typically including one or more high pressure and/or low pressure separation stages therebetween for recovery of recycle hydrogen). The fractionating zone typically includes one or more outlets for discharging gases, typically Hz, $H_2S$, $NH_3$, and light hydrocarbons ($C_1$-$C_4$); one or more outlets for recovering products, such as naphtha 1162 and middle distillate range products 1164, and one or more outlets for discharging bottoms 1166 including hydrocarbons boiling above the atmospheric gas oil range (for instance 370° C.). In certain embodiments, the temperature cut point for the bottoms stream (and correspondingly the end point for the products) is a range corresponding to the upper temperature limit of the middle distillate range products 1164.

In operation of a hydrocracking zone 1160 operating as a once-through single reactor hydrocracking system, the feedstock and hydrogen are charged to the reaction zone. The hydrogen is provided in an effective quantity to support the requisite degree of hydrocracking, feed type, and other factors, and can be any combination including recycle hydrogen from optional gas separation subsystems associated with reaction zone, hydrogen derived from the fractionator gas stream, and/or make-up hydrogen, if necessary. In certain embodiments, a reaction zone can contain multiple catalyst beds and can receive one or more quench hydrogen streams between the beds.

The reaction effluent stream contains converted, partially converted and unconverted hydrocarbons. Reaction effluents are passed to the fractionating zone (optionally after one or more high pressure and low pressure separation stages to recover recycle hydrogen), generally to recover gas and liquid products and by-products, and separate a bottoms fraction.

The gas stream, typically containing $H_2$, $H_2S$, $NH_3$, and light hydrocarbons ($C_1$-$C_4$), is discharged and recovered, and/or integrated directly in a fuel gas system. LPG can be recovered and one or more cracked product streams are discharged via appropriate outlets of the fractionator as the naphtha 1162 and middle distillate range products 1164. In certain embodiments, a fractionating zone can operate as a flash vessel to separate heavy components at a suitable cut point, for example, a range corresponding to the upper temperature range of the middle distillate range products 1164. In certain embodiments, a suitable cut point is in the range of 350 to 450° C., 360 to 450° C., 370 to 450° C., 350 to 400° C., 360 to 400° C., 370 to 400° C., 350 to 380° C., or 360 to 380° C.

The reactor arrangement in the gas oil hydrocracking zone 1160 operating as a once-through single reactor hydrocracking system can contain one or more fixed-bed, ebullated-bed, slurry-bed, moving bed, continuous stirred tank (CSTR), or tubular reactors, which can be in parallel arrangement, and is operated under conditions effective for gas oil hydrocracking, the particular type of reactor, the feed characteristics, the desired product slate and the catalyst selection. The once-through single reactor hydrocracking system can operate in a mild hydrocracking mode of operation or a partial conversion mode of operation. Additional equipment, including exchangers, furnaces, feed pumps, quench pumps, and compressors to feed the reactor(s) and maintain proper operating conditions, are well known and are considered part of the once-through single reactor hydrocracking system. In addition, equipment, including pumps, compressors, high temperature separation vessels, low temperature separation vessels and the like to separate reaction products and provide hydrogen recycle within the once-through single reactor hydrocracking system, are well known and are considered part of the once-through single reactor hydrocracking system.

In certain embodiments, operating conditions for the reactor(s) in a hydrocracking zone 1160 using a once-through (single stage without recycle) configuration and operating in a mild hydrocracking mode include:

a reactor temperature (° C.) in the range of from about 300-500, 300-475, 300-450, 330-500, 330-475 or 330-450;

a hydrogen partial pressure (barg) in the range of from about 100-200, 100-180, 100-160, 120-200, 120-180, 120-160, 140-200, 140-180, or 140-160;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

Under the above conditions and catalyst selections, exemplary products from the gas oil hydrocracking zone 1160 operating as a once-through single reactor system, and operating in a mild hydrocracking mode of operation, include 27-52, 27-48, 30-50 or 30-52 wt % of effluent (relative to the feed to the gas oil hydrocracking zone 1160) boiling at or below the atmospheric residue end boiling point, such as 370° C., including LPG and distillate product components (naphtha 1162 and middle distillate range products 1164). The remaining bottoms fraction is the unconverted oil fraction.

In certain embodiments, operating conditions for the reactor(s) in a hydrocracking zone 1160 using a once-through (single stage without recycle) configuration and operating in a partial conversion mode include:

a reactor temperature (° C.) in the range of from about 300-500, 300-475, 300-450, 330-500, 330-475 or 330-450;

a hydrogen partial pressure (barg) in the range of from about 100-200, 100-180, 100-160, 120-200, 120-180, 120-160, 140-200, 140-180, or 140-160;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

Under the above conditions and catalyst selections, exemplary products from the gas oil hydrocracking zone 1160 operating as a once-through single reactor system, and operating as a partial conversion hydrocracker, include 48-82, 50-80, 48-75, or 50-75 wt % of effluent (relative to the feed to the gas oil hydrocracking zone 1160) boiling at or below the atmospheric residue end boiling point, such as 370° C., including LPG and distillate product components (naphtha 1162 and middle distillate range products 1164). The remaining bottoms fraction is the unconverted oil fraction.

In certain embodiments, a gas oil hydrocracking zone 1160 operates as a series-flow hydrocracking system with recycle to the first reactor zone, the second reactor zone, or both the first and second reactor zones. In general, series flow hydrocracking zone includes a first reaction zone, a second reaction zone and a fractionating zone. The first reaction zone generally includes one or more inlets in fluid communication with the feedstock 1144 and a source of hydrogen gas, in certain embodiments a recycle stream comprising all or a portion of the fractionating zone bottoms stream (and optionally a portion of the fractionating zone products). One or more outlets of the first reaction zone that discharge an effluent stream is in fluid communication with one or more inlets of the second reaction zone. In certain embodiments, the effluents are passed to the second reaction zone without separation of any excess hydrogen and light gases. In optional embodiments, one or more high pressure and low pressure separation stages are provided between the first and second reaction zones for recovery of recycle hydrogen. The second reaction zone generally includes one or more inlets in fluid communication with one or more outlets of the first reaction zone, optionally a source of additional hydrogen gas, and in certain embodiments a recycle stream comprising all or a portion of the fractionating zone bottoms stream, and optionally a portion of the fractionating zone products. One or more outlets of the second reaction zone that discharge an effluent stream is in fluid communication with one or more inlets of the fractionating zone (optionally having one or more high pressure and low pressure separation stages in between the second reaction zone and the fractionating zone for recovery of recycle hydrogen). The fractionating zone includes one or more outlets for discharging gases, typically $H_2$, $H_2S$, $NH_3$, and light hydrocarbons ($C_1$-$C_4$); one or more outlets for recovering distillate products, such as naphtha 1162 and middle distillate range products 1164; and one or more outlets for discharging bottoms 1166 including hydrocarbons boiling above the atmospheric gas oil range (for instance about 370° C.), from which a bleed stream can be discharged in processes that do not operate with 100% recycle. In certain embodiments, the temperature cut point for the bottoms stream (and correspondingly the end point for the products) is a range corresponding to the upper temperature limit of the middle distillate range products 1164.

In operation of a hydrocracking zone 1160 operating as a series flow hydrocracking system with recycle, the feedstock and hydrogen are charged to the first reaction zone. The hydrogen is provided in an effective quantity to support the requisite degree of hydrocracking, feed type, and other factors, and can be any combination including recycle hydrogen from optional gas separation subsystems associated with one or both of the reaction zones, derived from the fractionator gas stream, and/or make-up hydrogen. In certain embodiments, one or both of the reaction zones can contain multiple catalyst beds and can receive one or more quench hydrogen streams between the beds.

The first reaction zone operates under effective conditions for production of a reaction effluent stream which is passed to the second reaction zone (optionally after one or more high pressure and low pressure separation stages to recover recycle hydrogen), optionally along with an additional hydrogen stream. The second reaction zone operates under conditions effective for production of the second reaction effluent stream, which contains converted, partially converted and unconverted hydrocarbons. The second reaction effluent stream is passed to the fractionating zone, generally to recover gas and liquid products and by-products, and separate a bottoms fraction. The gas stream, typically containing $H_2$, $H_2S$, $NH_3$, and light hydrocarbons ($C_1$-$C_4$), and LPG are discharged and recovered. One or more cracked product streams are discharged via appropriate outlets of the fractionator as the naphtha 1162 and middle distillate range products 1164. In certain embodiments, a fractionating zone can operate as a flash vessel to separate heavy components at a suitable cut point, for example, a range corresponding to the upper temperature range of the middle distillate range products 1164. In certain embodiments, a suitable cut point is in the range of 350 to 450° C., 360 to 450° C., 370 to 450° C., 350 to 400° C., 360 to 400° C., 370 to 400° C., 350 to 380° C., or 360 to 380° C.

In certain embodiments at least a portion of the fractionator bottoms stream from the reaction effluent is recycled to the first or second reaction zones. In certain embodiments, a portion of the fractionator bottoms from the reaction effluent is removed as bleed stream, which can be about 0-10 vol %, 1-10 vol %, 1-5 vol % or 1-3 vol % of the fractionator bottoms. For instance, a recycle stream to the first reaction zone can comprise 0 to 100 vol %, 0 to about 80 vol %, or 0 to about 50 vol % of the fractionator bottoms stream, and a recycle stream to the second reaction zone can comprise 0 to 100 vol %, 0 to about 80 vol %, or 0 to about 50 vol % of the fractionator bottoms stream.

The reactor arrangement in the gas oil hydrocracking zone 1160 operating as a series flow hydrocracking system with recycle can contain one or more fixed-bed, ebullated-bed, slurry-bed, moving bed, continuous stirred tank (CSTR), or tubular reactors, which can be in parallel arrangement, and are operated under conditions effective for gas oil hydrocracking, the particular type of reactor, the feed characteristics, the desired product slate and the catalyst selection. Additional equipment, including exchangers, furnaces, feed pumps, quench pumps, and compressors to feed the reactor(s) and maintain proper operating conditions, are well known and are considered part of the series flow hydrocracking system. In addition, equipment, including pumps, compressors, high temperature separation vessels, low temperature separation vessels and the like to separate reaction products and provide hydrogen recycle within the series flow hydrocracking system, are well known and are considered part of the series flow hydrocracking system.

In certain embodiments, operating conditions for the first reactor(s) in a hydrocracking zone 1160 using a once-through series configuration (with recycle) operating in a partial conversion mode of operation include:
- a reactor temperature (° C.) in the range of from about 300-500, 300-475, 300-450, 330-500, 330-475 or 330-450;
- a hydrogen partial pressure (barg) in the range of from about 100-200, 100-180, 100-160, 120-200, 120-180, 120-160, 140-200, 140-180, or 140-160;
- a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and
- a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

In certain embodiments, operating conditions for the second reactor(s) in a hydrocracking zone 1160 using a once-through series configuration (with recycle) operating in a partial conversion mode of operation include:
- a reactor temperature (° C.) in the range of from about 300-500, 300-475, 300-450, 330-500, 330-475 or 330-450;
- a hydrogen partial pressure (barg) in the range of from about 100-200, 100-180, 100-160, 120-200, 120-180, 120-160, 140-200, 140-180, or 140-160;
- a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and
- a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

Under the above conditions and catalyst selections, exemplary products from a hydrocracking zone 1160 using a series-flow configuration (with recycle) and operating as a partial conversion hydrocracker include 48-82, 50-80, 48-75 or 50-75 wt % of effluent (relative to the feed to the hydrocracking zone 1160) boiling at or below the atmospheric residue end boiling point, such as 370° C., including LPG and distillate product components (naphtha 1162 and middle distillate range products 1164). The remaining bottoms fraction is the unconverted oil fraction.

In certain embodiments, a gas oil hydrocracking zone 1160 operates as a two-stage hydrocracking system with recycle, and typically includes a first reaction zone, a second reaction zone and a fractionating zone. The first reaction zone generally includes one or more inlets in fluid communication with the feedstock 1144 and a source of hydrogen gas. One or more outlets of the first reaction zone that discharge an effluent stream is in fluid communication with one or more inlets of the fractionating zone (optionally having one or more high pressure and low pressure separation stages therebetween for recovery of recycle hydrogen. The fractionating zone includes one or more outlets for discharging gases, typically $H_2S$, $NH_3$, and light hydrocarbons ($C_1$-$C_4$); one or more outlets for recovering distillate product, such as naphtha 1162 and middle distillate range 1164; and one or more outlets for discharging bottoms 1166 including hydrocarbons boiling above the atmospheric gas oil range (for instance about 370° C.), from which a bleed stream can be discharged in processes that do not operate with 100% recycle. In certain embodiments, the temperature cut point for the bottoms stream (and correspondingly the end point for the products) is a range corresponding to the upper temperature limit of the middle distillate range products 1164. The fractionating zone bottoms outlet is in fluid communication with the one or more inlets of the second reaction zone for receiving a recycle stream, which is all or a portion of the bottoms stream. In certain optional embodiments, a portion of the bottoms stream is in fluid communication with one or more inlets of the first reaction zone. The second reaction zone generally includes one or more inlets in fluid communication with the fractionating zone bottoms outlet portion and a source of hydrogen gas. One or more outlets of the second reaction zone that discharge effluent stream are in fluid communication with one or more inlets of the fractionating zone (optionally having one or more high pressure and low pressure separation stages therebetween for recovery of recycle hydrogen).

In operation of a hydrocracking zone 1160 operating as a two-stage hydrocracking system with recycle, the feedstock and hydrogen are charged to the first reaction zone. The hydrogen is provided in an effective quantity to support the requisite degree of hydrocracking, feed type, and other factors, and can be any combination including recycle hydrogen from optional gas separation subsystems associated with the reaction zones, derived from the fractionator gas stream, and/or make-up hydrogen, if necessary. In certain embodiments, a reaction zone can contain multiple catalyst beds and can receive one or more quench hydrogen streams between the beds.

The first reaction zone operates under effective conditions for production of a reaction effluent stream which is passed to the fractionating zone (optionally after one or more high pressure and low pressure separation stages to recover recycle hydrogen) generally to recover gas and liquid products and by-products, and separate a bottoms fraction. The gas stream, typically containing $H_2$, $H_2S$, $NH_3$, and light hydrocarbons ($C_1$-$C_4$) and LPG is discharged and recovered. One or more cracked product streams are discharged via appropriate outlets of the fractionator as the naphtha 1162 and middle distillate range products 1164. In certain embodiments, a portion of the middle distillate range products 1164 can be integrated with the feed to the second stage reactor. In certain embodiments, a fractionating zone can operate as a flash vessel to separate heavy components at a suitable cut point, for example, a range corresponding to the upper temperature range of the middle distillate range products 1164. In certain embodiments, a suitable cut point is in the range of 350 to 450° C., 360 to 450° C., 370 to 450° C., 350 to 400° C., 360 to 400° C., 370 to 400° C., 350 to 380° C., or 360 to 380° C.

In certain embodiments at least a portion of the fractionator bottoms stream from the reaction effluent is recycled to the first or second reaction zones. In certain embodiments, a portion of the fractionator bottoms from the reaction effluent is removed as bleed stream, which can be about 0-10 vol %, 1-10 vol %, 1-5 vol % or 1-3 vol % of the fractionator bottoms. In certain embodiments, all or a portion of the bottoms stream is recycled to the second reaction zone, the first reaction zone, or both the first and second reaction zones. For instance, a recycle stream to the first reaction zone can comprise 0 to 100 vol %, 0 to about 80 vol %, or 0 to about 50 vol % of the fractionator bottoms stream, and a recycle stream to the second reaction zone can comprise 0 to 100 vol %, 0 to about 80 vol %, or 0 to about 50 vol % of the fractionator bottoms stream.

The second reaction zone operates under conditions effective for production of the reaction effluent stream, which contains converted, partially converted and unconverted hydrocarbons. The second stage reaction effluent is passed to the fractionating zone, optionally through one or more gas separators to recover recycle hydrogen and remove certain light gases.

The reactor arrangement in the gas oil hydrocracking zone 1160 operating as a two-stage hydrocracking system with recycle can contain one or more fixed-bed, ebullated-bed, slurry-bed, moving bed, continuous stirred tank (CSTR), or tubular reactors, which can be in parallel arrangement, and are operated under conditions effective for gas oil hydrocracking, the particular type of reactor, the feed characteristics, the desired product slate and the catalyst selection. Additional equipment, including exchangers, furnaces, feed pumps, quench pumps, and compressors to feed the reactor(s) and maintain proper operating conditions, are well known and are considered part of the two-stage hydrocracking system. In addition, equipment, including pumps, compressors, high temperature separation vessels, low temperature separation vessels and the like to separate reaction products and provide hydrogen recycle within the two-stage hydrocracking system, are well known and are considered part of the two-stage hydrocracking system.

In certain embodiments, operating conditions for the first stage reactor(s) in a hydrocracking zone 1160 using a two-stage (with recycle) configuration operating in a full conversion mode of operation include:

a reactor temperature (° C.) in the range of from about 300-500, 300-475, 300-450, 330-500, 330-475 or 330-450;

a hydrogen partial pressure (barg) in the range of from about 100-200, 100-180, 100-160, 120-200, 120-180, 120-160, 140-200, 140-180, or 140-160;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

In certain embodiments, operating conditions for the second stage reactor(s) in a hydrocracking zone 1160 using a two-stage (with recycle) configuration operating in a full conversion mode of operation include:

a reactor temperature (° C.) in the range of from about 300-500, 300-475, 300-450, 330-500, 330-475 or 330-450;

a hydrogen partial pressure (barg) in the range of from about 100-200, 100-180, 100-160, 120-200, 120-180, 120-160, 140-200, 140-180, or 140-160;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

Under the above conditions and catalyst selections, exemplary products from a hydrocracking zone 1160 using a two-stage hydrocracker (with recycle) configuration in a full conversion mode include 78-99, 78-90, 78-85, 80-90 or 80-99 wt % of effluent (relative to the feed to the hydrocracking zone 1160 boiling at or below the atmospheric residue end boiling point, such as 370° C., including LPG, and distillate product components (naphtha 1162 and middle distillate range products 1164). The remaining bottoms fraction is the unconverted oil fraction.

The gas oil hydrotreating zone 1170 can operate under mild, moderate or severe conditions, depending on factors including the feedstock and the desired degree of conversion. Such conditions are effective for removal of a significant amount of the sulfur and other known contaminants, and for conversion of the feed(s) into a major proportion of hydrotreated gas oil 1176 that is treated separately, and minor proportions of off-gases, light ends, and hydrotreated naphtha 1172. The hydrotreated gas oil fraction 1176 generally contains the portion of the gas oil hydrotreating zone 1170 effluent that is at or above the AGO, H-AGO or VGO range.

One or more outlets of the reaction zone of the gas oil hydrotreating zone 1170 that discharge an effluent stream are in fluid communication with one or more inlets of a fractionating zone having outlets for the hydrotreated naphtha stream 1172 and cracked distillates stream 1174 (typically including one or more high pressure and/or low pressure separation stages therebetween for recovery of recycle hydrogen), wherein the hydrotreated naphtha stream and cracked distillates stream products are derived from the liquid bottoms from the final low pressure stage.

The gas oil hydrotreating zone 1170 can contain one or more fixed-bed, ebullated-bed, slurry-bed, moving bed, continuous stirred tank (CSTR) or tubular reactors, in series and/or parallel arrangement, and is operated under conditions effective for gas oil hydrotreating, the particular type of reactor, the feed characteristics, the desired product slate and the catalyst selection. Additional equipment, including exchangers, furnaces, feed pumps, quench pumps, and compressors to feed the reactor(s) and maintain proper operating conditions, are well known and are considered part of the gas oil hydrotreating zone 1170. In addition, equipment, including pumps, compressors, high temperature separation vessels, low temperature separation vessels and the like to separate reaction products and provide hydrogen recycle within the gas oil hydrotreating zone 1170, are well known and are considered part of the gas oil hydrotreating zone 1170.

An effective quantity of catalyst is provided in the gas oil hydrotreating zone 1170, including those possessing hydrotreating functionality, for hydrodesulfurization and hydrodenitrification. Such catalysts generally contain one or more active metal component of metals or metal compounds (oxides or sulfides) selected from the Periodic Table of the Elements IUPAC Groups 6, 7, 8, 9 and 10. In certain embodiments, the active metal component is one or more of Co, Ni, W and Mo. The active metal component is typically deposited or otherwise incorporated on a support, such as amorphous alumina, amorphous silica alumina, zeolites, or combinations thereof. In certain embodiments, the catalyst used in the gas oil hydrotreating zone 1170 includes one or more beds selected from Co/Mo, Ni/Mo, Ni/W, and Co/Ni/Mo. Combinations of one or more beds of Co/Mo, Ni/Mo, Ni/W and Co/Ni/Mo can also be used. The combinations can be composed of different particles containing a single active metal species, or particles containing multiple active species. In certain embodiments, a combination of Co/Mo catalyst and Ni/Mo catalyst are effective for hydrodesulfurization and hydrodenitrification. One or more series of reactors can be provided, with different catalysts in the different reactors of each series. For instance, a first reactor includes Co/Mo catalyst and a second reactor includes Ni/Mo catalyst.

In additional embodiments, an effective quantity of hydrodemetallization also can be added. Such catalysts generally contain one or more active metal component of metals or metal compounds (oxides or sulfides) selected from the Periodic Table of the Elements IUPAC Groups 6, 7, 8, 9 and 10. In certain embodiments, the active metal component is one or more of Ni and Mo. The active metal component is typically deposited or otherwise incorporated on a support such as gamma alumina.

In certain embodiments, the gas oil hydrotreating zone 1170 operating conditions include:
a reactor temperature (° C.) in the range of from about 300-440, 300-400, 300-390, 310-440, 310-400, 310-390, 320-440, 320-400 or 320-390;
a hydrogen partial pressure (barg) in the range of from about 30-100, 30-80, 30-60, 40-100, 40-80, 40-60, 50-100, 50-80 or 50-60;
a hydrogen gas feed rate (standard liters per liter of hydrocarbon feed, SLt/Lt) of up to about 1000, 750 or 500, in certain embodiments from about 100-1000, 100-750, 100-500, 200-1000, 200-750, 200-500, 300-1000, 300-750 or 300-500; and
a liquid hourly space velocity ($h^{-1}$), on a fresh feed basis relative to the hydrotreating catalysts, in the range of from about 0.5-10.0, 0.5-5.0, 0.5-4.0, 1.0-10.0, 1.0-5.0, 1.0-4.0, 2.0-10.0, 2.0-5.0 or 2.0-4.0.

Under the above conditions and catalyst selections, exemplary products from the gas oil hydrotreating zone 1170 include 1-30, 5-30, 2-27 or 5-27 wt % of effluent (relative to the feed to the gas oil hydrotreating zone 1170) boiling at or below the atmospheric residue end boiling point, such as 370° C., including LPG, kerosene, naphtha, and atmospheric gas oil range components. The remaining bottoms fraction is the hydrotreated gas oil fraction.

In additional embodiments, the gas oil hydrotreating zone 1170 can operate under conditions effective for feed conditioning and to maximize targeted conversion. Accordingly, in certain embodiments severity conditions are selected that achieve objectives differing from those used for conventional refinery operations. That is, while typical VGO hydrotreating operates with less emphasis on conservation of liquid product yield, in the present embodiment VGO hydrotreating operates to produce a higher yield of lighter products which are intentionally recovered to maximize chemicals yield. In embodiments to maximize conversion to petrochemicals, the gas oil hydrotreating zone 1170 operating conditions include:
a reactor temperature (° C.) in the range of from about 320-440, 320-420, 320-410, 330-440, 330-420, 330-410, 330-400, 340-440, 340-420, 340-410 or 340-400;
a hydrogen partial pressure (barg) in the range of from about 40-100, 40-90, 40-80, 45-100, 45-90, 45-80, 50-100, 50-90 or 50-80;
a hydrogen gas feed rate (standard liters per liter of hydrocarbon feed, SLt/Lt) of up to about 1000, 900 or 800, in certain embodiments from about 300-1000, 300-900, 300-800, 400-1000, 400-900, 400-800, 500-1000, 500-900 or 500-800; and a liquid hourly space velocity ($h^{-1}$), on a fresh feed basis relative to the hydrotreating catalysts, in the range of from about 0.2-4.0, 0.2-3.0, 0.2-2.0, 0.5-4.0, 0.5-3.0, 0.5-2.0, 1.0-4.0,
1.0-3.0 or 1.0-2.0.

In certain embodiments, the gas oil hydrotreating zone 1170 contains one or more trains of reactors, with a first reactor having two catalyst beds with two quench streams including an inter-bed quench stream, and a second reactor (lag reactor) having one catalyst bed with a quench stream. In high capacity operations, two or more parallel trains of reactors are utilized. In such embodiments, the flow in gas oil hydrotreating zone 1170 is split after the feed pump into parallel trains, wherein each train contains feed/effluent heat exchangers, feed heater, a reactor and the hot separator. The trains recombine after the hot separators. Tops from the hot separators are combined and passed to a cold separator. Bottoms from the hot separators are passed to a hot flash drum. Bottoms from the cold separator and tops from the hot flash drum are passed to a low pressure flash drum to remove off-gasses. Hot flash liquid bottoms and low pressure flash bottoms are passed to a stripper to recover hydrotreated gas oil and naphtha. Tops from the cold separator are subjected to absorption and amine scrubbing. Recycle hydrogen is recovered and passed (along with make-up hydrogen) to the reaction zone as treat gas and quench gas.

EXAMPLE

A straight run diesel sample derived from Arabian light crude oil was obtained. Table 2 summarizes the composition and properties of the diesel oil blend. A mixture of disulfide oil (DSO-90 W %) and oxidized disulfide oil (ODSO-10 W %) was added (2.1 W % relative to the total reactants) and the mixture was reacted over a conventional hydrodesulfurization catalyst composed of Ni—Mo as active phase metals on an alumina support. The reaction took place at a temperature of 335° C., hydrogen partial pressure of 46 bar, hydrogen-to-hydrocarbon ratio of 300 StLt/Lt, and LHSV of 0.71 h$^{-1}$.

TABLE 2

| Property/Composition | Unit | Value |
|---|---|---|
| Density | g/cc | 0.8373 |
| Sulfur | W% | 0.995 |
| Nitrogen | ppmw | 53 |
| IBP | ° C. | 124 |
| 5 | ° C. | 177 |
| 10 | ° C. | 196 |
| 30 | ° C. | 245 |
| 50 | ° C. | 286 |
| 70 | ° C. | 326 |
| 90 | ° C. | 377 |
| 95 | ° C. | 400 |
| FBP | ° C. | 461 |

The individual feedstock components, that is, the ODSO compounds, the DSO compounds and the straight run diesel, the blended feedstock reactant and hydrotreated diesel products were analyzed by a gas chromatograph hyphenated to a mass spectrometer (GC-MS).

The GC-MS was fitted with a non-polar chromatographic column (DB1, 30 m long, 0.25 mm ID and 2.5 um film thickness). The column was operated under a constant carrier gas (helium) flow of 0.69 ml/min. The GC-MS oven was ramped from 35° C. (10) min to 325° C. at 5° C./min (20) min. For identification purposes, the mass spectra collected were matched with the NIST mass spectral database. The results are shown in FIG. 8.

Figure 8:
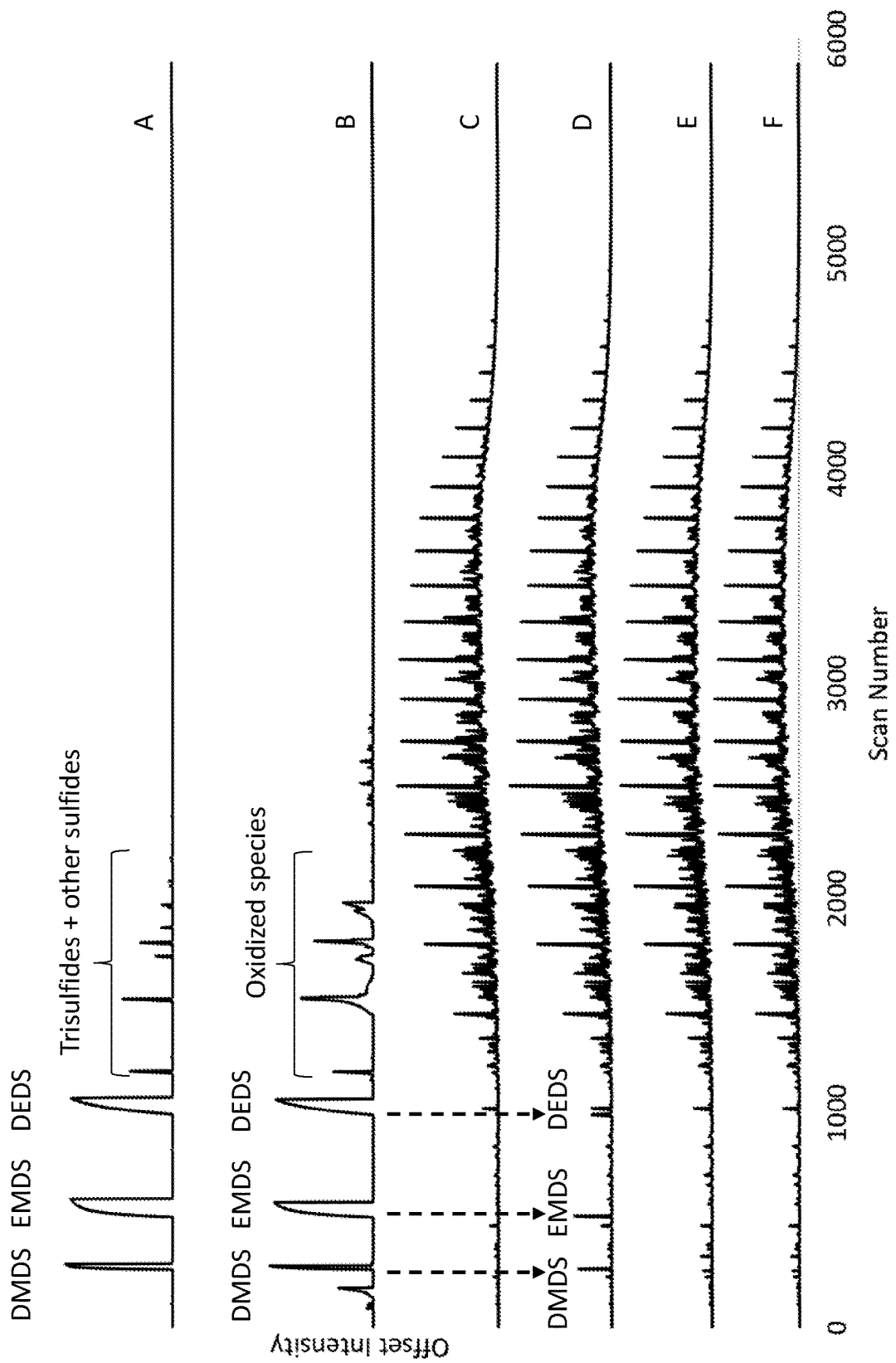
FIG. 8 shows the GC-MS spectra of reactants and products of the integrated process of the present disclosure.

Spectrum A in FIG. 8 shows the GC-MS spectrum of pure disulfide oil where certain individual disulfide oil molecules are identified. Spectrum B in FIG. 8 shows the GC-MS spectrum of the disulfide oil and oxidized disulfide oil compounds obtained from the E-MEROX process. The ratio of DSO compounds to ODSO compounds related to Spectrum B is 64 W %:36 W %. Spectrum C in FIG. 8 shows the GC-MS spectrum of the straight run diesel sample derived from Arabian light crude oil. Since this is a spectrum of only the diesel oil, no disulfide and oxidized disulfide oil components are present. Spectrum D in FIG. 8 shows the GC-MS spectrum of the diesel and DSO/ODSO mixture feed where additional DSO was added to reach a DSO/ODSO spiking level of 2.1 W % and a ratio of DSO compounds to ODSO compounds in the mixture of 90 W %:10 W %. This is the reactant that undergoes hydrotreating. Spectra E and F in FIG. 8 show the hydrotreated product composition that was produced on different days during the same run under the same conditions. It is clear that there are no DSO or ODSO components in the product which indicates that the DSO and ODSO components are converted according to the integrated process.

Adding an otherwise waste product into a hydroprocessing complex not only achieves the benefits of producing hydrogen sulfide, water and alkanes, but also provides an environmentally suitable means of disposal of by-product waste. Additional benefits of the process described herein include eliminating or reducing the waste storage and treatment units and expenses that would otherwise be required to dispose of DSO and/or ODSO waste.

It will be understood from the above description that the process of the present disclosure provides a cost effective and environmentally acceptable means for disposing of by-product oxidized disulfide oils, and can convert what may be essentially a low value refinery material into hydrogen sulfide, water and alkanes products.

The process of the present invention has been described above and in the attached figures; process modifications and variations will be apparent to those of ordinary skill in the art from this description and the scope of protection is to be determined by the claims that follow.

The invention claimed is:

1. A hydroprocessing reaction process comprising:
   reacting in a hydroprocessing zone a hydroprocessing feed in the presence of hydrogen and an oxidized disulfide oil (ODSO) stream containing ODSO compounds, wherein the hydroprocessing zone comprises a hydrocracking catalyst and/or a hydrotreating catalyst; and
   recovering hydrocracked or hydrotreated effluents and light gases,
      wherein ODSO compounds are converted into hydrogen sulfide, water and C1-C10 alkanes under hydroprocessing reaction conditions, and
      wherein the hydrogen sulfide and C1-C4 alkanes pass with the light gases and C5-C10 alkanes pass with the hydrocracked or hydrotreated effluent.

2. The process as in claim 1, further comprising, prior to reacting, a step of mixing the hydroprocessing feed with the ODSO stream to produce an enhanced hydroprocessing feed that contains ODSO components, wherein reacting in the hydroprocessing zone comprises reacting the enhanced hydroprocessing feed.

3. The process as in claim 2, wherein the mixing is in a mixing zone.

4. The process of claim 1, wherein a disulfide oil (DSO) stream is combined with the ODSO stream prior to its reaction with the hydroprocessing feed stream to produce a combined ODSO/DSO stream that is reacted with the hydroprocessing feed in the hydroprocessing zone.

5. The process of claim 4, wherein the DSO stream is derived from an effluent refinery hydrocarbon stream recovered downstream of an MEROX unit.

6. The process of claim 5, wherein a feed to the MEROX unit is from a source that is the same as a source for the hydroprocessing feed stream.

7. The process of claim 1, wherein the ODSO stream is derived from an effluent refinery hydrocarbon stream recovered downstream of an enhanced MEROX (E-MEROX) unit.

8. The process of claim 1 wherein an atmospheric distillation unit separates a crude oil or condensates stream upstream of the hydroprocessing reaction to produce an atmospheric distillation product stream that is the hydroprocessing feed stream of claim 1.

9. The process of claim 8, wherein the atmospheric distillation product stream is a naphtha stream and the hydroprocessing reaction occurs in a naphtha hydrotreatment zone.

10. The process of claim 8, wherein the atmospheric distillation product stream is a middle distillate stream and the hydroprocessing zone comprises a middle distillates hydrotreatment zone.

11. The process of claim 10, in which the middle distillates hydrotreatment zone operates at a temperature in the range of about 270-450° C., at a hydrogen partial pressure in the range of about 30-80 barg, at a hydrogen gas feed rate in the range of about 200-1000 SLt/Lt, and at a liquid hourly space velocity in the range of about 0.1-10.0 h$^{-1}$.

12. The process of claim 8, wherein the atmospheric distillation product is an atmospheric residue stream, and the atmospheric residue stream is treated in a vacuum distillation unit to produce a vacuum gas oil stream that is the hydroprocessing feed stream of claim 1, and further wherein the hydroprocessing zone comprises a vacuum gas oil hydroprocessing zone.

13. The process of claim 12, wherein the vacuum gas oil hydroprocessing zone comprises a vacuum gas oil hydrotreater.

14. The process of claim 12, wherein the vacuum gas oil hydroprocessing zone comprises a vacuum gas oil hydrocracker.

15. The process of claim 3, in which the DSO stream comprises one or more disulfide compounds.

16. The process of claim 1, in which the ODSO stream comprises one or more oxidized disulfide compounds.

17. The process of claim 1, in which the one or more oxidized disulfide compounds is selected from the group consisting of (R—SO—S—R'),(R—SOO—S—R'),(R—SOO—SO—R'), (R—SOO—SOO—R'),(R—SO—SO—R'),(R—SO—SOO—OH), (R—SOO—SOO—OH),(R—SO—SO—OH), and (R—SOO—SO—OH), and mixtures thereof, where R and R' are alkyl groups comprising 1-10 carbon atoms.

18. The process of claim 1, in which the ratio of ODSO stream or ODSO/DSO stream to hydroprocessing feed is in the range of from 10-50,000 ppmw, 10-10,000 ppmw, 10-1,000 ppmw, 10-500 ppmw, 10-300 ppmw, or 10-100 ppmw.

19. The process of claim 1, wherein the water is in an aqueous phase and is separated from alkanes in an oil/water separation unit.

20. An integrated hydroprocessing system comprising:

an enhanced MEROX (E-MEROX) unit operable to receive and convert a disulfide oil (DSO) stream feed into an oxidized disulfide oil (ODSO) stream, the E-MEROX unit comprising one or more inlets in fluid communication with a source of DSO stream and one or more outlets; and a hydroprocessing complex operable to receive and convert a hydroprocessing feed and an ODSO stream and produce a hydrotreated or hydrocracked effluent from the hydroprocessing feed and hydrogen sulfide, water and alkanes from the ODSO stream and, the hydroprocessing complex comprising one or more inlets in fluid communication with a source of hydroprocessing feed and the one or more E-MEROX outlets.

* * * * *